(12) United States Patent
Takayama et al.

(10) Patent No.: US 8,479,000 B2
(45) Date of Patent: Jul. 2, 2013

(54) INFORMATION PROCESSING DEVICE, AUTHENTICATION SYSTEM, AUTHENTICATION DEVICE, INFORMATION PROCESSING METHOD, INFORMATION PROCESSING PROGRAM, RECORDING MEDIUM, AND INTEGRATED CIRCUIT

(75) Inventors: Hisashi Takayama, Osaka (JP); Hideki Matsushima, Osaka (JP); Takayuki Ito, Osaka (JP); Tomoyuki Haga, Nara (JP); Kenneth Alexander Nicolson, Hyogo (JP)

(73) Assignee: Panasonic Corporation, Osaka (JP)

( * ) Notice: Subject to any disclaimer, the term of this patent is extended or adjusted under 35 U.S.C. 154(b) by 246 days.

(21) Appl. No.: 12/992,699

(22) PCT Filed: Oct. 9, 2009

(86) PCT No.: PCT/JP2009/005277
§ 371 (c)(1),
(2), (4) Date: Nov. 15, 2010

(87) PCT Pub. No.: WO2010/041464
PCT Pub. Date: Apr. 15, 2010

(65) Prior Publication Data
US 2011/0072266 A1    Mar. 24, 2011

(30) Foreign Application Priority Data

Oct. 10, 2008    (JP) ................. 2008-263678

(51) Int. Cl.
*H04L 29/06*    (2006.01)
*H04L 9/00*    (2006.01)
*H04K 1/00*    (2006.01)
*G06F 15/177*    (2006.01)
*G06F 17/00*    (2006.01)
*H04L 12/18*    (2006.01)
*H04L 9/08*    (2006.01)
*H04L 9/32*    (2006.01)
*G06F 21/22*    (2006.01)

(52) U.S. Cl.
USPC ........... 713/171; 713/168; 713/169; 713/181; 713/183; 726/11; 705/51

(58) Field of Classification Search
USPC   713/171, 169, 168, 181, 183; 705/51; 726/11
See application file for complete search history.

(56) References Cited

U.S. PATENT DOCUMENTS

| | | | |
|---|---|---|---|
| 7,424,612 B2 | 9/2008 | England et al. | |
| 7,487,365 B2 | 2/2009 | England et al. | |
| 7,587,589 B2 | 9/2009 | England et al. | |
| 7,752,456 B2 | 7/2010 | England et al. | |
| 7,765,397 B2 | 7/2010 | England et al. | |
| 2003/0200440 A1 | 10/2003 | England et al. | |
| 2003/0200450 A1 | 10/2003 | England et al. | |
| 2005/0289067 A1* | 12/2005 | Lampson et al. | ............... 705/51 |
| 2007/0067624 A1 | 3/2007 | England et al. | |
| 2007/0086588 A1 | 4/2007 | England et al. | |
| 2007/0088946 A1 | 4/2007 | England et al. | |
| 2007/0088949 A1 | 4/2007 | England et al. | |
| 2009/0094692 A1* | 4/2009 | Ono et al. | ..................... 726/11 |
| 2009/0327741 A1* | 12/2009 | Zimmer et al. | ............... 713/183 |
| 2010/0011225 A1 | 1/2010 | Takayama | |

FOREIGN PATENT DOCUMENTS

| | | |
|---|---|---|
| JP | 2002-536757 | 10/2002 |
| JP | 2004-5595 | 1/2004 |
| WO | WO 0038392 A2 * | 6/2000 |
| WO | 00/48063 | 8/2000 |
| WO | 2008/026086 | 3/2008 |
| WO | 2008/081801 | 7/2008 |

OTHER PUBLICATIONS

Mohammad Mannan, Beom Heyn Kim, Afshar Ganjali, David Lie; "Unicorn: two-factor attestation for data security"; Oct. 2011; CCS '11: Proceedings of the 18th ACM conference on Computer and communications security Publisher: ACM; pp. 17-28.*

International Search Report issued Nov. 2, 2009 in International (PCT) Application No. PCT/JP2009/005277.

TPM Main Part 1 Design Principles, Specification Version 1.2, Level 2, Revision 103, Jul. 9, 2007.

TPM Main Part 2 TPM Structures, Specification Version 1.2, Level 2, Revision 103, Jul. 9, 2007.
TPM Main Part 3 Commands Specification, Version 1.2, Level 2, Revision 103, Jul. 9, 2007.
TCG Mobile Trusted Module Specification, Specification Version 1.0, Revision 1, Jun. 12, 2007.

* cited by examiner

*Primary Examiner* — Andrew L Nalven
*Assistant Examiner* — Courtney Fields
(74) *Attorney, Agent, or Firm* — Wenderoth, Lind & Ponack, L.L.P.

(57) ABSTRACT

The present invention provides an information processing device, an authentication system, etc. that save a server the trouble of updating a database, etc., even when a software module in a client device is updated, and that are capable of verifying whether software modules that have been started in the client device are valid. The terminal device A100 holds private keys 1 and 2, and performs authentication processing with the terminal device B101 using the private key 2. The private key 1 has been encrypted such that the private key 1 is decryptable only when secure boot is completed. The private key 2 has been encrypted such that the private key 2 is decryptable using the private key 1 only when the application module X that has been started is valid. When the authentication processing is successful, the terminal device B101 verifies that the terminal device A100 has completed secure boot and the application module X that has been started in the terminal device A100 is valid. Also, the terminal device B101 performs the authentication processing using the same private key 2, regardless of whether a program pertaining to the secure boot of the terminal device A100 is updated or not.

8 Claims, 29 Drawing Sheets

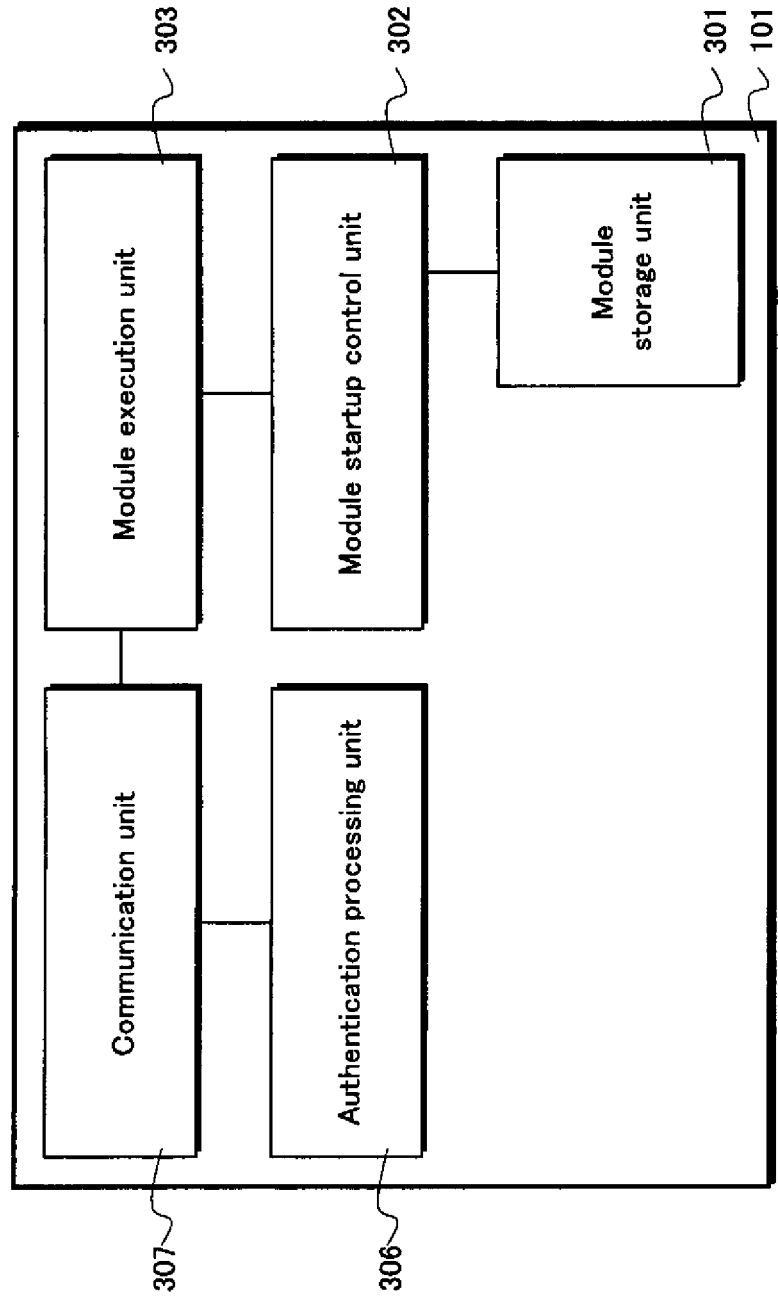

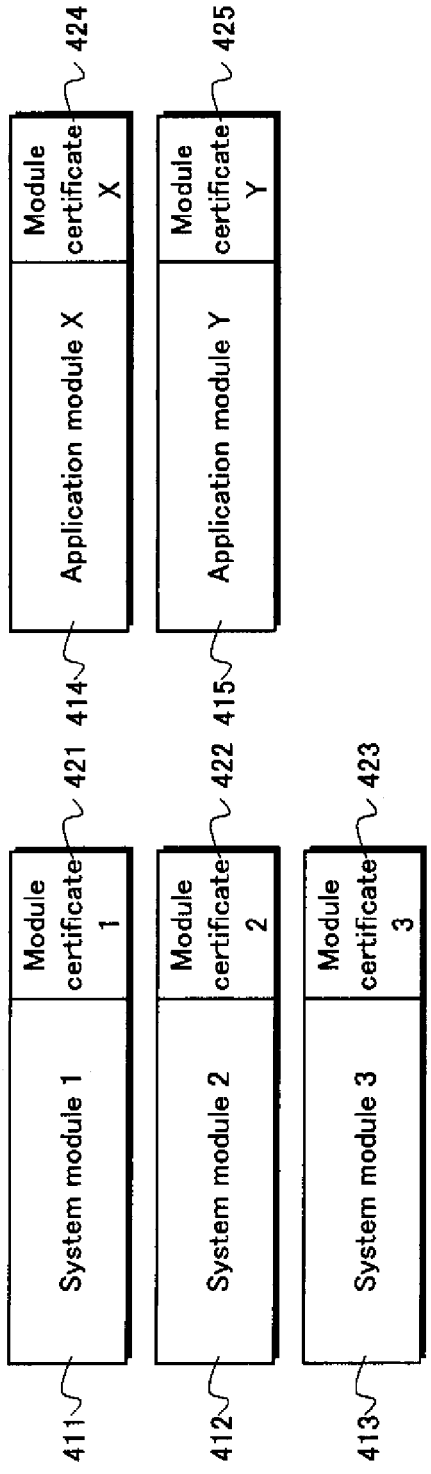
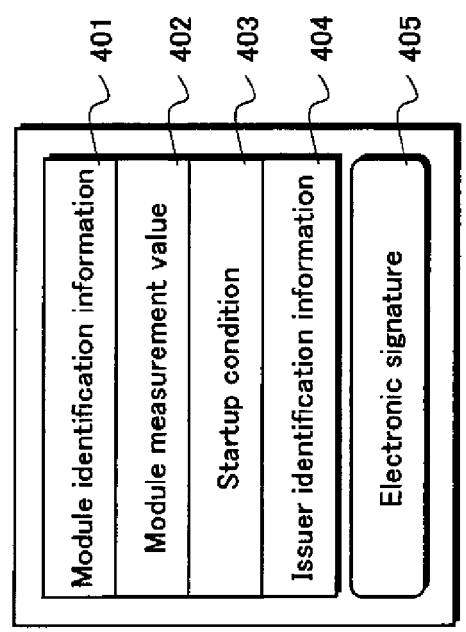
FIG. 4A
FIG. 4B

FIG. 6A

| | |
|---|---|
| Version | 601 |
| Algorithm ID | 602 |
| Issuer (Manufacturer of Terminal device A) | 603 |
| Effective period | 604 |
| Subject (Terminal device A) | 605 |
| Public key A1 | 606 |
| Usage condition of private key A1 | 607 |
| Terminal information | 608 |
| Issuer's signature (CA key for manufacturer of terminal device A) | 609 |

FIG. 6B

| | |
|---|---|
| Version | 611 |
| Algorithm ID | 612 |
| Issuer (Manufacturer of Terminal device A) | 613 |
| Effective period | 614 |
| Subject (Terminal device A) | 615 |
| Public key A2 | 616 |
| Usage condition of private key A2 | 617 |
| Issuer's signature (CA key for manufacturer of terminal device A) | 619 |

FIG. 13

| Name of application | Model | Expected value | URL |
|---|---|---|---|
| Application X | Terminal model A | 01000101110.....00 | https://www.appx.com/.... |
| Application X | Terminal model B | 11100011010.....11 | https://www.appx.com/.... |
| Application X | Terminal model C | 10001011101.....01 | https://www.appx.com/.... |
| Application Y | Terminal model A | 00010111000.....10 | https://www.appy.com/.... |
| Application Y | Terminal model B | 01011101110.....00 | https://www.appy.com/.... |
| Application Y | Terminal model C | 10011011001.....11 | https://www.appy.com/.... |

INFORMATION PROCESSING DEVICE, AUTHENTICATION SYSTEM, AUTHENTICATION DEVICE, INFORMATION PROCESSING METHOD, INFORMATION PROCESSING PROGRAM, RECORDING MEDIUM, AND INTEGRATED CIRCUIT

TECHNICAL FIELD

The present invention relates to telecommunications devices such as personal computers and mobile telephones, and to information processing devices such as home information appliances (e.g., television receivers provided with interne access functions). In particular, the present invention relates to a technique in which a transmission device verifies the integrity of a reception device when the transmission device exchanges data with the reception device.

BACKGROUND ART

In recent years, there have been an increased number of improper activities relating to contents. By performing such improper activities, a malicious third party (hereinafter "attacker") tampers with a software module that operates in a client terminal device so as to cause the software module to perform improper operations. In this way, the attacker fraudulently receives services by bypassing restrictions imposed on contents transmitted by a server. Also, by performing such improper activities, the attacker fraudulently saves or copies contents which are not permitted to be saved or copied.

To address such problems, a technique has been proposed by a TCG (Trusted Computing Group), etc., in which a server verifies the integrity of a platform in a client terminal device. In this technique, the server transmits contents to the client terminal device only when the integrity of the platform in the client terminal device is verified, thus preventing fraudulent saving or copying of the contents. The following describes the technique for verifying the integrity of the platform, by taking an example of a system in which a service provision server 2910 provides information service for a personal computer 2900, with reference to FIG. 29. The personal computer 2900 has a tamper-resistant module called a TPM (Trusted Platform Module) 2902 implemented therein. The TPM 2902 includes a PCR (Platform Configuration Register) 2904, which is a special register. A CPU 2901 of the personal computer 2900 executes codes of software modules including a BIOS 2905, an OS 2906, and an application 2907. In executing the codes, the CPU 2901 calculates hashes of the codes, and transmits the hashes to the TPM 2902. Upon receiving the hashes, the TPM 2902 concatenates the hashes with a hash already stored in the PCR 2904. Then, the TPM 2902 performs a hash operation on the concatenated value, and stores a result of the hash operation in the PCR 2904. The value of the PCR 2904 is a value obtained by cumulating the digest values of software modules executed by the CPU 2901, and indicates which software modules are executed in the personal computer 2900. At the time of requesting for provision of information service, the personal computer 2900 transmits the value (i.e., PCR value) of the PCR 2904 to the service provision server 2910, using a challenge-and-response method or the like. The service provision server 2910 includes a comparison value DB 2912. The comparison value DB 2912 stores PCR values (i.e., PCR comparison values), which are values in a case where valid software modules are being executed in the personal computer 2900. Upon receiving a PCR value, the service provision server 2910 compares the PCR value with a corresponding one of the PCR comparison values, thereby judging whether valid software modules are being executed in the personal computer 2900. The service provision server 2910 provides information service to the personal computer 2900, only when judging that valid software modules are being executed (see Patent Literature 1 and Non-Patent Literatures 1 to 4).

CITATION LIST

Patent Literature

[Patent Literature 1] Japanese Patent Application Publication No. 2002-536757

Non-Patent Literature

[Non-Patent Literature 1] TPM Main, Part 1 Design Principles, Specification version 1.2 Level 2 Revision 103 (9 Jul. 2007)
[Non-Patent Literature 2] TPM Main, Part 2 TPM Structures, Specification version 1.2 Level 2 Revision 103 (9 Jul. 2007)
[Non-Patent Literature 3] TPM Main Part 3 Commands, Specification version 1.2 Level 2 Revision 103 (9 Jul. 2007)
[Non-Patent Literature 4] TCG Mobile Trusted Module Specification version 1.0 Revision 1 (12 Jun. 2007)

SUMMARY OF INVENTION

Technical Problem

However, the aforementioned technique has the following problem. Assume that a software module in the personal computer 2900, such as the OS 2906, is updated to a new version or the like. In this case, the service provision server 2910 needs to acquire information of the updated software module in the personal computer 2910, and to calculate the latest PCR comparison values for the personal computer 2900 in order to keep the comparison value DB up to date. If update of the comparison value DB is delayed, the personal computer 2900 fails in authentication even when valid software modules are being executed.

The present invention has been achieved in view of the above problem, and an aim thereof is to provide an information processing device, an authentication system, an authentication device, an information processing method, an information processing program, a recording medium, and an integrated circuit that save a server the trouble of updating a database, etc., even when a software module in a client device is updated, and that are capable of verifying the integrity of the client device and whether software modules that have been started in the client device are valid.

Solution to Problem

In order to solve the above problem, one aspect of the present invention is an information processing device for executing an application program upon completing secure boot of a plurality of system programs, the secure boot being processing of sequentially executing the system programs while verifying integrity thereof, the application program being subject to authentication processing performed with an authentication device, the information processing device comprising: a key holding unit holding therein a first decryption key corresponding to a first encryption key; a key information holding unit holding therein a second decryption key and an authentication key, the second decryption key having been encrypted using the first encryption key and being permitted to be used only when a first condition is satisfied, the first condition being that integrity of the system programs is maintained after the secure boot, the authentication key having been encrypted using a second encryption key that corresponds to the second decryption key, and being permitted to be used only when a second condition is satisfied, the second condition being that integrity of the application program is maintained; a decryption processing unit operable to decrypt the encrypted second decryption key using the first decryption key to obtain the second decryption key, to decrypt the encrypted authentication key using the second decryption key to obtain the authentication key only when the first condition is satisfied, and to output the authentication key only when the second condition is satisfied; and an authentication processing unit operable, when the authentication key is output, to perform the authentication processing with the authentication device using the authentication key.

Advantageous Effects of Invention

With the stated structure, in a case where any of the system programs is updated after the secure boot, an information processing device according to one aspect of the present invention replaces the encrypted second decryption key in the key information holding unit with a new second decryption key that has been encrypted together with the first condition using the first encryption key, the first condition being that the new second decryption key is permitted to be used only when the integrity of the system programs is maintained after the next secure boot. By performing only this replacing processing, the information processing device can decrypt the encrypted second decryption key even after the update, resulting in the encrypted authentication key not being affected by the update. Meanwhile, the authentication device can perform the authentication processing with the information processing device using the authentication key, either before or after the update. In other words, even if any of the system programs is updated in the information processing device after the secure boot, the same authentication key can be used to perform the authentication processing so as to verify that the integrity of the system programs is maintained after the next secure boot, and that the integrity of the application program is maintained. Also, the authentication device does not need to hold and update a database, etc., unlike the conventional techniques.

BRIEF DESCRIPTION OF DRAWINGS

FIG. 3 is a block diagram showing a structure of a terminal device B according to Embodiment 1 of the present invention.

FIG. 4A shows software modules stored in a module storage unit of the terminal device A and module certificates thereof according to Embodiment 1 of the present invention, and FIG. 4B shows a data structure of each module certificate according to Embodiment 1 of the present invention.

FIG. 6A shows a data structure of a certificate A1 according to Embodiment 1 of the present invention, and FIG. 6B shows a data structure of a certificate A2 of Embodiment 1 of the present invention.

FIG. 13 shows one example of an expected value list held in an expected value holding unit of the terminal device C according to Embodiment 2 of the present invention.

DESCRIPTION OF EMBODIMENTS

Figure 1:
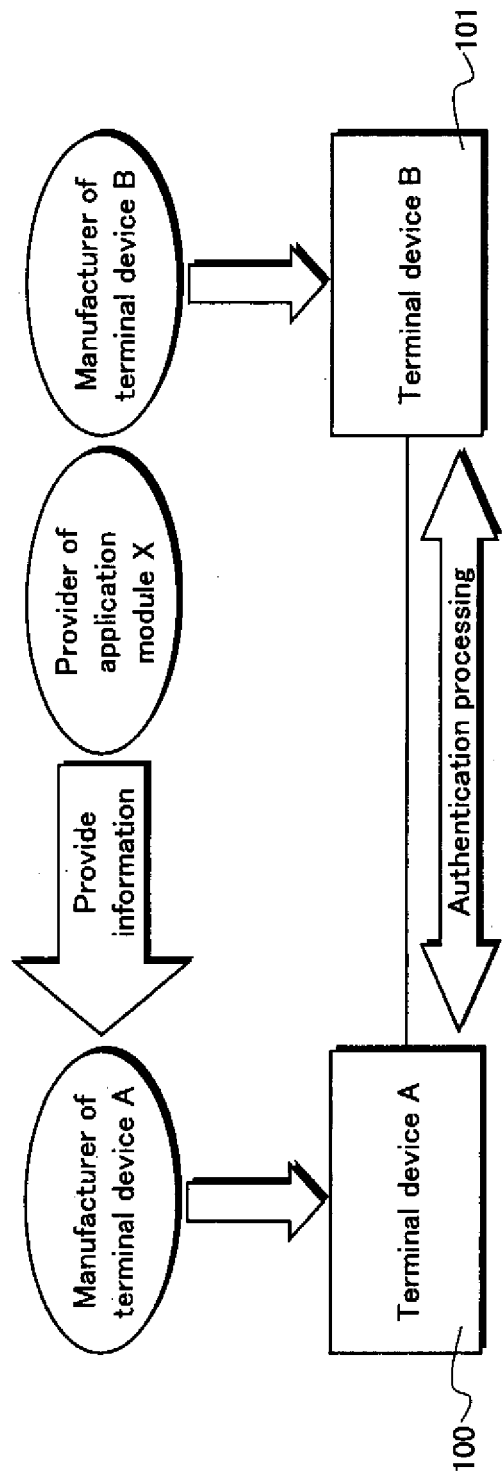
FIG. 1 is a block diagram showing a system structure according to Embodiment 1 of the present invention.

One aspect of the present invention is an information processing device for executing an application program upon completing secure boot of a plurality of system programs, the secure boot being processing of sequentially executing the system programs while verifying integrity thereof, the application program being subject to authentication processing performed with an authentication device, the information processing device comprising: a key holding unit holding therein a first decryption key corresponding to a first encryption key; a key information holding unit holding therein a second decryption key and an authentication key, the second decryption key having been encrypted using the first encryption key and being permitted to be used only when a first condition is satisfied, the first condition being that integrity of the system programs is maintained after the secure boot, the authentication key having been encrypted using a second encryption key that corresponds to the second decryption key, and being permitted to be used only when a second condition is satisfied, the second condition being that integrity of the application program is maintained; a decryption processing unit operable to decrypt the encrypted second decryption key using the first decryption key to obtain the second decryption key, to decrypt the encrypted authentication key using the second decryption key to obtain the authentication key only when the first condition is satisfied, and to output the authentication key only when the second condition is satisfied; and an authentication processing unit operable, when the authentication key is output, to perform the authentication processing with the authentication device using the authentication key.

Also, the information processing device may further comprise: the a generation unit operable, every time any of the system programs and the application program is started, to generate a digest value thereof, perform a cumulative operation on the digest value to obtain a cumulative value, and hold the cumulative value, wherein the second decryption key held in the key information holding unit has been encrypted with an expected value of the cumulative value after the secure boot using the first encryption key, and the authentication key has been encrypted with an expected value of the digest value of the application program using the second encryption key, and the decryption processing unit may judge that the first condition is satisfied only when the expected value of the cumulative value decrypted together with the second decryption key matches the cumulative value generated by the generation unit after the secure boot, and may judge that the second condition is satisfied only when the expected value of the digest value decrypted together with the authentication key matches the digest value of the application program generated by the generation unit.

With the stated structure, the second decryption key is encrypted with (hereinafter "bound to") the expected value of the cumulative value after the secure boot. In this way, the second decryption key is encrypted in a manner that the second decryption key is permitted to be used only when the secure boot has been completed successfully. Also, the authentication key is bound to the expected value of the digest value of the application program. In this way, the authentication key is encrypted in a manner that the authentication key is permitted to be used only when the application program that has started is not tampered with.

Also, the information processing device may further comprise: a program update unit operable to perform update processing on any of the system programs; and a key information update unit operable, when the update processing is performed after the secure boot, to replace the encrypted second decryption key in the key information holding unit with a new second decryption key that has been encrypted with an expected value of the cumulative value after next secure boot.

With the stated structure, even when any of the system programs is updated, only the encrypted second decryption key is updated so as to be correspondent with the updated system program. The encrypted authentication key is not affected by the update. Generally, the developer of a system program (e.g., OS) is different from the developer of an application program (e.g., game software). In such a case, even if a system program is updated, only the encrypted second decryption key, which relates to the system program, is affected by the update. Meanwhile, the authentication device can perform the authentication processing with the information processing device using the authentication key, either before or after the update of the system program. In other words, even if any of the system programs is updated in the information processing device after the secure boot, the authentication device does not need to hold and update a database, etc., unlike the conventional techniques. Instead, the authentication device uses the same authentication key to perform the authentication processing so as to verify that the integrity of the system programs is maintained after the next secure boot, and that the integrity of the application program is maintained.

Also, the information processing device may further comprise an expected value holding unit holding therein the expected value of the digest value of the application program and the expected value of the cumulative value after the secure boot, wherein the key information holding unit may read the expected values from the expected value holding unit, and may use the expected values to judge whether the first and second conditions are satisfied.

With the stated structure, it is possible to store in advance the expected value of the digest value of the application program and the expected value of the cumulative value after the secure boot. Also, in the case of acquiring, from an external device in advance, the expected value of the digest value of the application program and the expected value of the cumulative value after the secure boot, the information processing device can hold the expected values therein.

Also, the authentication processing unit may be further operable, prior to the authentication processing, (i) to cause the decryption processing unit to decrypt the encrypted second decryption key, (ii) to acquire the second decryption key output from the decryption processing unit only when the first condition is satisfied, and (iii) to perform pre-authentication processing with the authentication device using the second decryption key, and the encrypted authentication key may be a key acquired from the authentication device and written into the key information holding unit when the pre-authentication processing is completed successfully.

Another aspect of the present invention is an authentication system including an authentication device and an information processing device that is for executing an application program upon completing secure boot of a plurality of system programs, the secure boot being processing of sequentially executing the system programs while verifying integrity thereof, the application program being subject to authentication processing performed with the authentication device, wherein the information processing device comprises: a key holding unit securely holding therein a first decryption key corresponding to a first encryption key; a key information holding unit holding therein a second decryption key having been encrypted using the first encryption key and being permitted to be used only when a first condition is satisfied, the first condition being that integrity of the system programs is maintained after the secure boot; a decryption processing unit operable to decrypt the encrypted second decryption key using the first decryption key to obtain the second decryption key, and to output the second decryption key only when the first condition is satisfied; and a first authentication processing unit operable, when the second decryption key is output, to perform first authentication processing with the authentication device using the second decryption key, the authentication device comprises: a second authentication processing unit operable to perform the first authentication processing with the information processing device using the second decryption key; and a transmission unit operable, when the first authentication processing is completed successfully, to transmit, to the information processing device, an authentication key having been encrypted using a second encryption key corresponding to the second decryption key, the authentication key being permitted to be used only when a second condition is satisfied, the second condition being that the authentication key is permitted to be used when integrity of the application program is maintained, wherein the first authentication processing unit acquires the encrypted authentication key and writes the encrypted authentication key into the key information holding unit, the decryption processing unit decrypts the encrypted second decryption key using the first decryption key to obtain the second decryption key after the encrypted authentication key is written into the key information holding unit, decrypts the encrypted authentication key using the second decryption key to obtain the authentication key only when the first condition is satisfied, and outputs the authentication key only when the second condition is satisfied, wherein the first authentication processing unit performs second authentication processing with the authentication device using the authentication key, when the authentication key is output by the decryption processing unit, and the second authentication processing unit performs the second authentication processing with the information processing device using the authentication key, after the authentication key is transmitted by the transmission unit.

Another aspect of the present invention is an authentication device for performing authentication processing with an information processing device that holds therein a first decryption key and that is for executing an application program upon completing secure boot of a plurality of system programs, the secure boot being processing of sequentially executing the system programs while verifying integrity thereof, the first decryption key having been encrypted and being permitted to be used only when a first condition is satisfied, the first condition being that integrity of the system programs is maintained after the secure boot, the authentication device comprising: an authentication processing unit operable to perform first authentication processing with the information processing device using the first decryption key; and a transmission unit operable, when the first authentication processing is completed successfully, to transmit, to the information processing device, an authentication key that has been encrypted using a first encryption key corresponding to the first decryption key, the authentication key being permitted to be used when a second condition is satisfied, the second condition being that integrity of the application program is maintained, wherein after the encrypted authentication key is transmitted, the authentication processing unit performs second authentication processing with the information processing device using the authentication key so as to verify integrity of the application program.

With the stated structure, regardless of whether any of the system programs in the information processing device is updated or not, the authentication device can generate the encrypted authentication key to be transmitted to the information processing device as long as the second decryption key and the digest value of the application program are known in advance. After the encrypted authentication key is transmitted to the information processing device, the authentication device can perform the authentication processing with the information processing device using the authentication key. Also, in a case where any of the system programs in the information processing device is updated after the secure boot, the information processing device replaces the encrypted second decryption key in the key information holding unit with a new second decryption key that has been encrypted together with the first condition using the first encryption key, the first condition being that the new second decryption key is permitted to be used only when the integrity of the system programs is maintained after the next secure boot. By performing only this replacing processing, the information processing device can decrypt the encrypted second decryption key even after the update, resulting in the encrypted authentication key not being affected by the update. Meanwhile, the authentication device can perform the authentication processing with the information processing device using the authentication key, either before or after the update. In other words, even if any of the system programs is updated in the information processing device after the secure boot, the same authentication key can be used to perform the authentication processing so as to verify that the integrity of the system programs is maintained after the next secure boot, and that the integrity of the application program is maintained. Also, the authentication device does not need to hold and update a database, etc., unlike the conventional techniques.

Another aspect of the present invention is an information processing method used in an information processing device for executing an application program upon completing secure boot of a plurality of system programs, the secure boot being processing of sequentially executing the system programs while verifying integrity thereof, the application program being subject to authentication processing performed with an authentication device, the information processing method comprising the steps of: holding therein a first decryption key corresponding to a first encryption key; holding therein a second decryption key and an authentication key, the second decryption key having been encrypted using the first encryption key and being permitted to be used only when a first condition is satisfied, the first condition being that integrity of the system programs is maintained after the secure boot, the authentication key having been encrypted using a second encryption key that corresponds to the second decryption key, and being permitted to be used only when a second condition is satisfied, the second condition being that integrity of the application program is maintained; decrypting the encrypted second decryption key using the first decryption key to obtain the second decryption key, decrypting the encrypted authentication key using the second decryption key to obtain the authentication key only when the first condition is satisfied, and outputting the authentication key only when the second condition is satisfied; and when the authentication key is output, performing the authentication processing with the authentication device using the authentication key.

Another aspect of the present invention is an information processing program used in an information processing device for executing an application program upon completing secure boot of a plurality of system programs, the secure boot being processing of sequentially executing the system programs while verifying integrity thereof, the application program being subject to authentication processing performed with an authentication device, the information processing program causing a computer to execute the steps of: holding therein a first decryption key corresponding to a first encryption key; holding therein a second decryption key and an authentication key, the second decryption key having been encrypted using the first encryption key and being permitted to be used only when a first condition is satisfied, the first condition being that integrity of the system programs is maintained after the secure boot, the authentication key having been encrypted using a second encryption key that corresponds to the second decryption key, and being permitted to be used only when a second condition is satisfied, the second condition being that integrity of the application program is maintained; decrypting the encrypted second decryption key using the first decryption key to obtain the second decryption key, decrypting the encrypted authentication key using the second decryption key to obtain the authentication key only when the first condition is satisfied, and outputting the authentication key only when the second condition is satisfied; and when the authentication key is output, performing the authentication processing with the authentication device using the authentication key.

Another aspect of the present invention is a computer-readable recording medium storing thereon an information processing program used in an information processing device for executing an application program upon completing secure boot of a plurality of system programs, the secure boot being processing of sequentially executing the system programs while verifying integrity thereof, the application program being subject to authentication processing performed with an authentication device, the information processing program causing a computer to execute the steps of: holding therein a first decryption key corresponding to a first encryption key; holding therein a second decryption key and an authentication key, the second decryption key having been encrypted using the first encryption key and being permitted to be used only when a first condition is satisfied, the first condition being that integrity of the system programs is maintained after the secure boot, the authentication key having been encrypted using a second encryption key that corresponds to the second decryption key, and being permitted to be used only when a second condition is satisfied, the second condition being that integrity of the application program is maintained; decrypting the encrypted second decryption key using the first decryption key to obtain the second decryption key, decrypting the encrypted authentication key using the second decryption key to obtain the authentication key only when the first condition is satisfied, and outputting the authentication key only when the second condition is satisfied; and when the authentication key is output, performing the authentication processing with the authentication device using the authentication key.

Another aspect of the present invention is an integrated circuit used in an information processing device for executing an application program upon completing secure boot of a plurality of system programs, the secure boot being processing of sequentially executing the system programs while verifying integrity thereof, the application program being subject to authentication processing performed with an authentication device, the integrated circuit comprising: a key holding unit holding therein a first decryption key corresponding to a first encryption key; a key information holding unit holding therein a second decryption key and an authentication key, the second decryption key having been encrypted using the first encryption key and being permitted to be used only when a first condition is satisfied, the first condition being that integrity of the system programs is maintained after the secure boot, the authentication key having been encrypted using a second encryption key that corresponds to the second decryption key, and being permitted to be used only when a second condition is satisfied, the second condition being that integrity of the application program is maintained; a decryption processing unit operable to decrypt the encrypted second decryption key using the first decryption key to obtain the second decryption key, to decrypt the encrypted authentication key using the second decryption key to obtain the authentication key only when the first condition is satisfied, and to output the authentication key only when the second condition is satisfied; and an authentication processing unit operable, when the authentication key is output, to perform the authentication processing with the authentication device using the authentication key.

According to the stated structure, in a case where any of the system programs is updated after the secure boot, the information processing device replaces the encrypted first decryption key that has been held with a new first decryption key that has been encrypted together with the first condition using the second encryption key, the first condition being that the new first decryption key is permitted to be used only when the integrity of the system programs is maintained after the next secure boot. By performing only this replacing processing, the information processing device can decrypt the encrypted first decryption key even after the update, resulting in the encrypted authentication key not being affected by the update. Meanwhile, the authentication device can perform the authentication processing with the information processing device using the authentication key, either before or after the update. In other words, even if any of the system programs is updated in the information processing device after the secure boot, the same authentication key can be used to perform the authentication processing so as to verify that the integrity of the system programs is maintained after the next secure boot, and that the integrity of the application program is maintained. Also, the authentication device does not need to hold and update a database, etc., unlike the conventional techniques.

1. Embodiment 1

The following describes Embodiment 1 of the present invention.

FIG. 1 shows a system structure according to Embodiment 1.

A terminal device A100 and a terminal device B101 are connected to each other using wired or wireless communications, and mutually perform data communications. Specifically, the terminal device A100 is equipped with an application module X, and receives contents from the terminal device B101 via streaming transmission, using the application module X. The application module X is preinstalled in the terminal device A100 by a manufacturer of the terminal device A100, together with system modules of the terminal device A100 before shipment. The manufacturer is provided with information on the application module X, such as version information, object code, etc. from a provider of the application module X in advance. After the shipment, the software modules mounted in the terminal device A100 may be tampered with.

The terminal device B101 transmits contents to the terminal device A100 using a streaming method. At this time, if a software module in the terminal device A100 is tampered with, the terminal device A100 may perform processing unintended by the terminal device B101 by control of the tampered software module. As a result, the contents may be fraudulently saved into the terminal device A100 or fraudulently transferred to another terminal device. Therefore, in view of copy right protection, the terminal device B101 needs to prevent such unintended processing performed by the terminal device A100. Accordingly, the terminal device B101 performs authentication processing to judge whether any tampered software module has been started in the terminal device A100. In other words, the terminal device B101 judges whether the integrity of the terminal device A100 is maintained and system modules and the application module X that are started in the terminal device A100 are valid.

Figure 24:
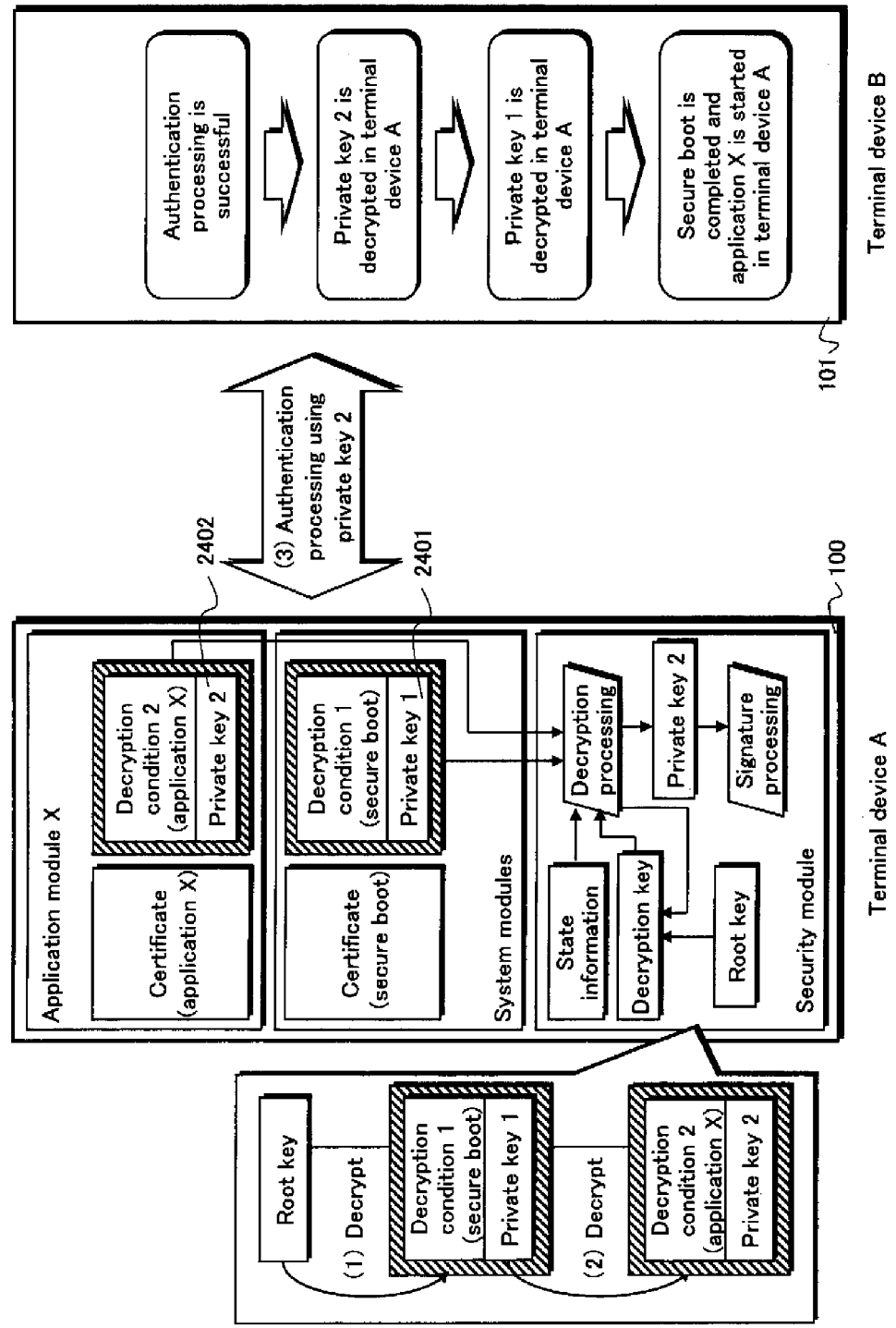
FIG. 24 shows a mechanism of the authentication processing in which the terminal device B authenticates the terminal device A according to Embodiment 1 of the present invention.

The following describes an outline of the authentication processing, with reference to FIG. 24.

The terminal device A100 holds two private keys 1 and 2 (2401 and 2402) that have been encrypted. The private keys 1 and 2 (2401 and 2402) are private keys in an RSA (RIVEST SHAMIR ADLEMAN) encryption method. The length of each of the private keys 1 and 2 (2401 and 2402) is 2048 bits. Each of these private keys has been encrypted together with information indicating decryption conditions. These private keys, which have been encrypted, are decrypted in a security module mounted in the terminal device A100. The security module performs decryption processing, thereby obtaining the private keys and the decryption conditions that have been decrypted. At this time, the security module judges whether the decryption conditions are satisfied. When judging that the decryption conditions are not satisfied, the security module does not output the private keys to the outside of the security module. Here, the decryption condition information encrypted together with the private key 1 (2401) is information obtained when the terminal device A100 starts system modules thereof in secure boot processing. The security module holds state information indicating the startup states of the respective software modules in the terminal device A100. The security module verifies the decryption condition information using the state information. Details of the verification by the security module are described below. The private key 1 is encrypted in a manner that the private key 1 is decryptable using a root key held by the security module. The decryption condition information encrypted together with the private key 2 (2402) is information obtained when the terminal device A100 starts the application module X. The private key 2 is encrypted in a manner that the private key 2 is decryptable using the private key 1.

Prior to the authentication processing with the terminal device B101, the terminal device A100 decrypts the private key 1 (2401) that has been encrypted, using the root key held by the security module. Then, the terminal device A100 decrypts the private key 2 (2402) using the private key 1. Subsequently, the terminal device A100 performs the authentication processing with the terminal device B101, using the private key 2 (2402) that has been decrypted. In the authentication processing, the terminal device A100 generates an electronic signature using the private key 2, and transmits the electronic signature to the terminal device B101. The terminal device B101 performs authentication processing by verifying the validity of the electronic signature.

In the authentication processing, the terminal device B101 judges that authentication is successful, only when an electronic signature has been generated by the terminal device A100 using the private key 2. This means that the authentication processing is completed successfully only when the private key 2 (2402) is decrypted successfully by the terminal device A100. Also, the private key 2 (2402) is decrypted successfully only when the private key 1 (2401) is decrypted successfully by the terminal device A100. As described above, by only verifying the validity of the electronic signature transmitted by the terminal device A100, the terminal device B101 can check: the integrity of the terminal device A100; whether secure boot of the system modules in the terminal device A100 is completed; and whether the application module X that has been started is valid.

1.1. Structure 1.1.1. Terminal Device A100

Figure 2:
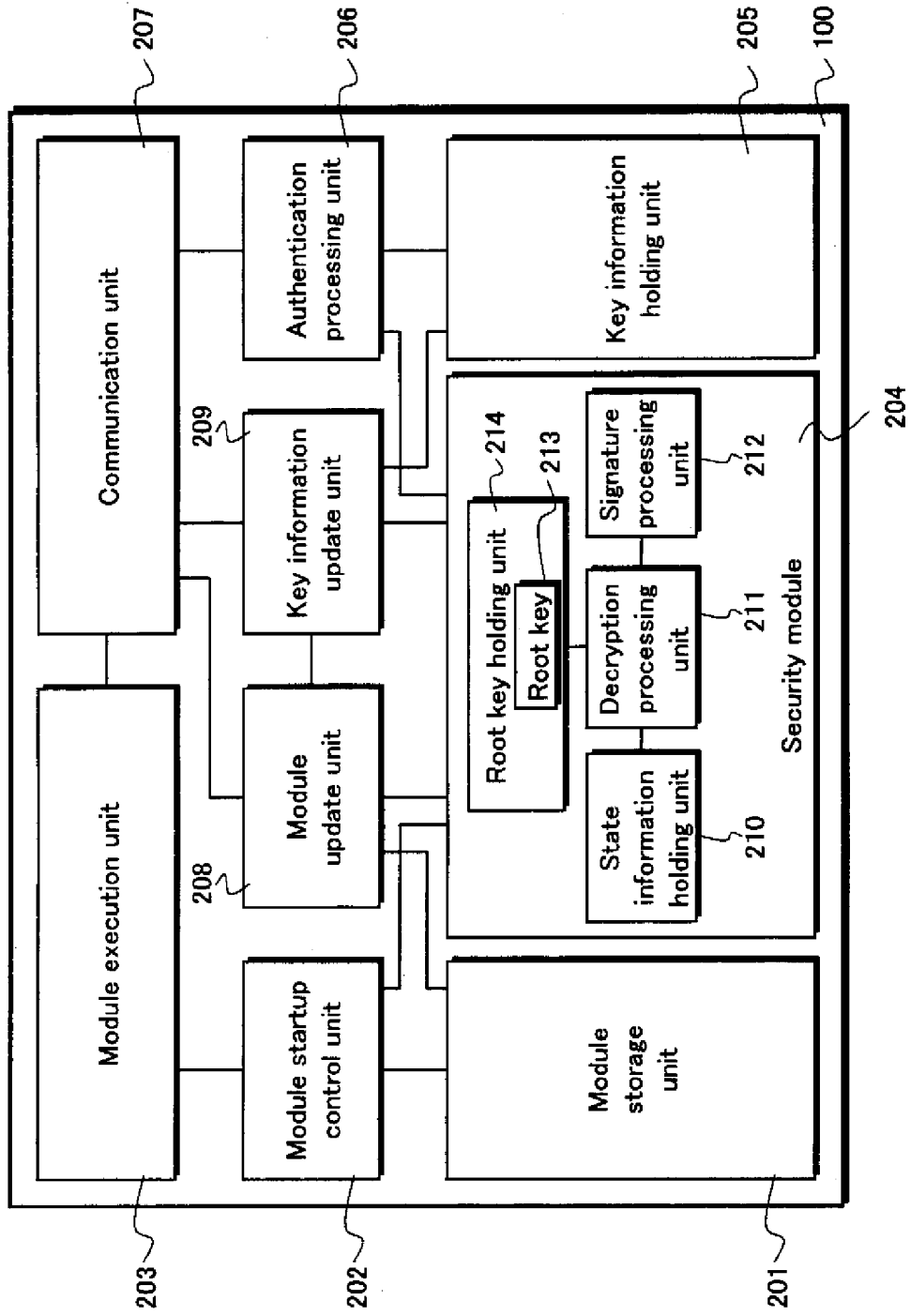
FIG. 2 is a block diagram showing a structure of a terminal device A according to Embodiment 1 of the present invention.

FIG. 2 shows a structure of the terminal device A100 according to Embodiment 1 of the present invention.

The terminal device A100 includes a module storage unit 201, a module startup control unit 202, a module execution unit 203, a security module 204, a key information holding unit 205, an authentication processing unit 206, a communication unit 207, a module update unit 208, and a key information update unit 209.

Also, the security module 204 includes a state information holding unit 210, a decryption processing unit 211, a signature processing unit 212, and a root key holding unit 214. The state information holding unit 210 holds the startup state of the software of the terminal device A100. The decryption processing unit 211 outputs a private key obtained by decrypting an encrypted key. The signature processing unit 212 performs signature processing using the private key output by the decryption processing unit 211. The root key 213 is a 2048-bit private key in the RSA encryption method.

The module storage unit 201 stores therein software modules executed by the module execution unit 203 in the terminal device A100.

FIG. 4A shows software modules stored in the module storage unit 201 and module certificates of the respective software modules.

At the time of secure boot of the terminal device A100, a system module 1 (411), a system module 2 (412), and a system module 3 (413) are sequentially started in the stated order. After the secure boot of the system modules, an application module X (414) and an application module Y (415) are started. Here, the secure boot refers to a boot method that boots a terminal device only when it is verified that none of the modules in the terminal device is tampered with.

FIG. 4B shows a data structure of a module certificate.

The module certificate includes module identification information 401, a module measurement value 402, a startup condition 403, issuer identification information 404, and an electronic signature 405. The module identification information 401 indicates a name that identifies a module corresponding to the module certificate. Specifically, the module identification information 401 is text data or a number that indicates a name that uniquely identifies the module. The module measurement value 402 is a hash value of the module. The startup condition 403 indicates a condition for permitting the start of the module. Specifically, the startup condition 403 specifies an expected value that is supposed to be stored in a register of the state information holding unit 210 described below, before starting the module corresponding to the certificate. In other words, the module corresponding to the certificate is permitted to be started when a value stored in the register of the state information holding unit 210 matches the value of the startup condition 403. The issuer identification information 404 is identification information that indicates an issuer of the module. The electronic signature 405 is an electronic signature that is generated, by the issuer of the module, for the module identification information 401, the module measurement value 402, the startup condition 403, and the issuer identification information 404.

The module startup control unit 202 controls the secure boot of the system modules in the module storage unit 201, and the startup of application modules. Specifically, when starting a module, the module startup control unit 202 verifies the electronic signature 405 of a module certificate corresponding to the module. When the verification is successful, the module startup control unit 202 generates a hash value of the module that is to be started. Then, the module startup control unit 202 compares the hash value with the module measurement value 402 of the module certificate, and starts the module only when the hash value matches the module measurement value 402. When starting each of the system modules 1, 2, and 3, the module startup control unit 202 further performs the following processing in addition to the verification of the electronic signature 405 and the comparison between the hash value of a system module and the module measurement value 402 thereof. That is, the module startup control unit 202 compares a value stored in the register of the state information holding unit 210 with the value of the startup condition 403. Then, the module startup control unit 202 starts the module only when the value matches the value of the startup condition 403. Assume here that the module startup control unit 202 starts the modules in the aforementioned boot procedure. In this case, if any of the modules is tampered with, the terminal device per se cannot be successfully booted. This makes it possible to securely boot the terminal device. This boot procedure is referred to as secure boot. Upon starting any of the system modules in the secure boot processing or either the application modules X or Y, the module startup control unit 202 performs a cumulative operation by adding the module measurement value 402 in the module certificate of the started software module to a value held in the register of the state information holding unit 210. As a result, information pertaining to the started software module is held in the state information holding unit 210. Specifically, the module startup control unit 202 performs a cumulative operation by concatenating the value held in the state information holding unit 210 with the module measurement value 402 of the module certificate, performing a hash operation using SHA1 (Secure Hash Algorithm One) on the concatenated value, and storing a result of the hash operation in the register of the state information holding unit 210. The cumulative operation is realized, for example, by adopting TPM Extend processing disclosed in "TPM Main Part1 Design Principle1", which is a TPM (Trusted Platform Module) specification of the TCG.

The module execution unit 203 provides an execution environment for software modules started by the module startup control unit 202.

The security module 204 is tamper-resistant and performs processing for decrypting an encrypted key. Details of the decryption processing are described below.

The key information holding unit 205 holds an encrypted key. In the present embodiment, the key information holding unit 205 holds two pieces of key information generated by the manufacturer of the terminal device A100, namely key information 500 and key information 510.

Figure 5:
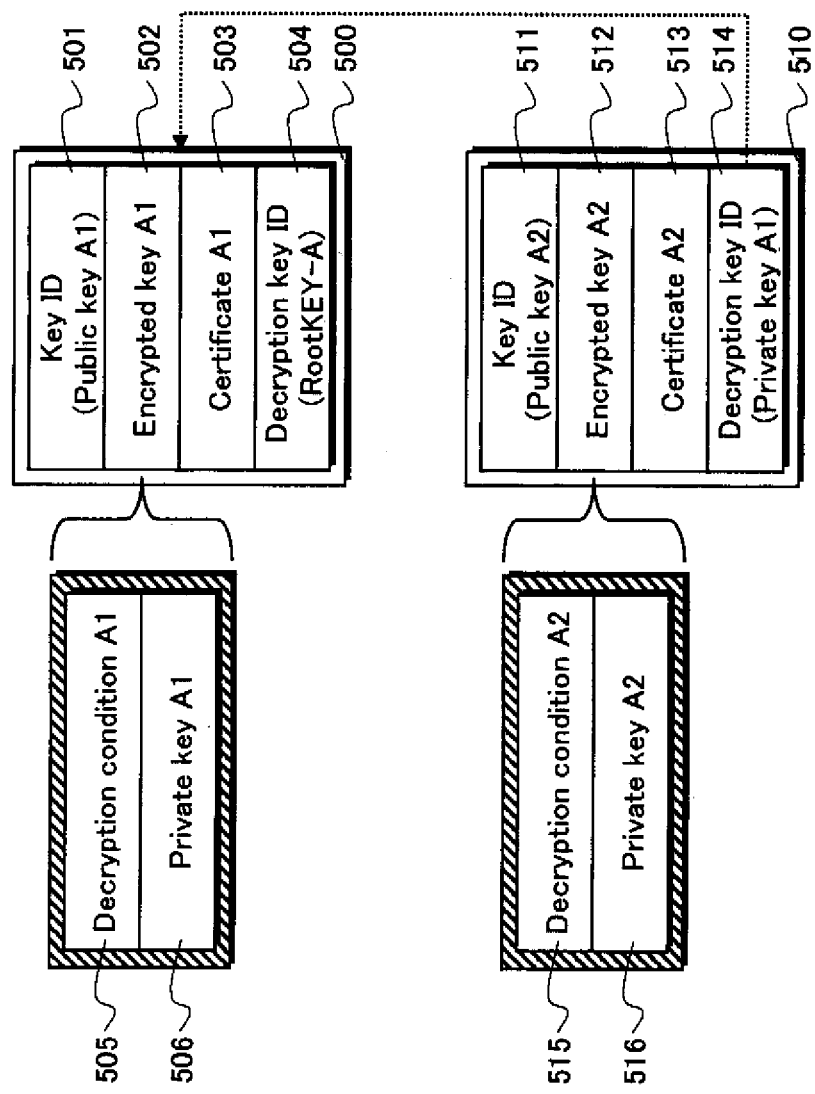
FIG. 5 shows key information held in a key information holding unit of the terminal device A according to Embodiment 1 of the present invention.

FIG. 5 shows a structure of key information held in the key information holding unit 205.

The key information 500 includes a key ID 501, an encrypted key A1 (502), a certificate A1 (503), and a decryption key ID (504). The key ID (501) is an ID that indicates a public key A1. The public key A1 corresponds to a private key A1 (506). The certificate A1 (503) is a certificate of the public key A1. Details of the certificate are described below. The decryption key ID (504) is an ID that indicates a root key (RootKEY-A), which is a decryption key of the encrypted key A1. The encrypted key A1 (502) is a key obtained by encrypting a decryption condition A1 (505) and the private key A1 (506), in a manner that the decryption condition A1 (505) and the private key A1 (506) are decryptable by the root key 213 indicated by the decryption key ID (504). In the present embodiment, the root key 213 is a private key in public key encryption, and the encrypted key A1 (502) is encrypted by a public key corresponding to the root key 213. The decryption condition A1 (505) indicates a condition for outputting the private key A1 after decryption of the encrypted key A1 (502). Specifically, the decryption condition A1 (505) is an expected value that is supposed to be held in the register of the state information holding unit 210 upon completion of secure boot of the system modules 1, 2, and 3 by the module startup control unit 202. The security module 204 outputs the private key A1 (506) to the outside of the security module 204 only when this expected value matches a value actually held in the register of the state information holding unit 210 after the secure boot is completed. This means that other modules can acquire the private key A1 (506) only when the secure boot is completed.

The key information 510 includes a key ID (511), an encrypted key A2 (512), a certificate A2 (513), and a decryption key ID (514). The key ID (511) is an ID that indicates a public key A2. The public key A2 corresponds to a private key A2 (516). The certificate A2 (513) is a certificate of the public key A2. Details of the certificate are described below. The decryption key ID (514) is an ID that indicates the private key A1, which is a decryption key of the encrypted key A2. The encrypted key A2 (512) is a key obtained by encrypting a decryption condition A2 (515) and the private key A2 (516), in a manner that the decryption condition A2 (515) and the private key A2 (516) are decryptable by the private key A1 (506) indicated by the decryption key ID (514). In the present embodiment, the private key A1 (506) is a private key in public key encryption, and the encrypted key A2 (512) is encrypted by the public key A1 corresponding to the private key A1 (506). The decryption condition A2 (515) indicates a condition for outputting the private key A2 after decryption of the encrypted key A2 (512). Specifically, the decryption condition A2 (515) shows an expected value that is supposed to be held in the register of the state information holding unit 210 when the application module X that is started by the module startup control unit 202 is valid. The security module 204 outputs the private key A2 (516) to the outside of the security module 204, only when this expected value matches a value actually held in the register of the state information holding unit 210 and the application module X that has been started is valid. This means that other modules can acquire the private key A2 (516) only when the application module X that has been started is valid. Note that each of the private keys A1 and A2 is a 2048-bit private key in the RSA encryption method.

As described above, the private key A1 (506) is required to decrypt the private key A2 (516) that has been encrypted. Also, the private key A1 (506) that has been encrypted is decryptable only when the secure boot is completed. This means that the private key A2 (516) that has been encrypted is decryptable only when the secure boot is completed and the application module X that has been started is valid.

The following describes in detail the certificates A1 (503) and A2 (513).

FIG. 6A shows a data structure of the certificate A1 (503), which is a certificate of the public key A1.

The certificate A1 (503) includes a version 601, an algorithm ID (602), an issuer 603, an effective period 604, a subject 605, a public key A1 (606), a usage condition 607 of the private key A1 (506), terminal information 608, and an issuer's signature 609.

The version 601 shows a version of a data structure of the certificate. The algorithm ID (602) shows an encryption algorithm of the private key A1. The issuer 603 shows an issuer of the certificate. In the present embodiment, the issuer 603 shows a manufacturer of the terminal device A100. The effective period 604 shows an effective period of the certificate. The subject 605 is a subject of the certificate A1 (503) that certifies the terminal device A100. The usage condition 607 shows attributes pertaining to the usage conditions of the public key A1 (606) and the private key A1 (506). The usage condition 607 includes information indicating the usage condition of the private key A1 (506). The information reads: "The private key A1 (506) has been encrypted. The private key A1 (506) is decryptable only when the secure boot of the terminal device A100 is completed". The information is in the form of text data or binary data such as data encoded using XML or ASN.1 (Abstract Syntax Notation One).

Figure 26A:
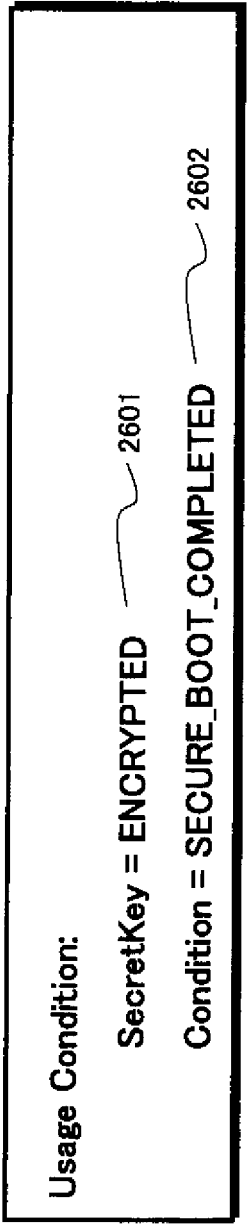
FIG. 26A shows one example of contents of data that is set as a usage condition of the certificate A1 according to the Embodiment 1 of the present invention.

FIG. 26A schematically shows contents of data in a case where the usage condition 607 is set in the ASN.1 format.

In this case, "SecretKey=ENCRYPTED" (2601) indicates that "the private key A1 (506) has been encrypted", as described above. Also, "Condition= SECURE#BOOT#COMPLETED" (2602) indicates that "the private key A1 (506) that has been encrypted is decryptable only when the secure boot of the terminal device A100 is completed". In practice, the aforementioned information pieces are encoded using TLV (Tag Length Value) encoding, according to BER (Basic Encoding Rules) or DER (Distinguished Encoding Rules), so as to obtain binary data. Then, the binary data is set as the usage condition 607.

The terminal information 608 indicates attributes pertaining to the terminal device A100, such as the model name of the terminal device A100, the name of the manufacturer thereof, information on encryption algorithms supported by the terminal device A100. The terminal information 608 includes other pieces of information, in addition to the model name, the manufacturer's name, and the information on the supported encryption algorithms. Specifically, the terminal information 608 includes information indicating registers for a system in the state information holding unit 210, and information indicating registers for an application of the state information holding unit 210. These pieces of information are set in the form of text data or binary data, such as data encoded using XML or ASN. 1.

Figure 27:
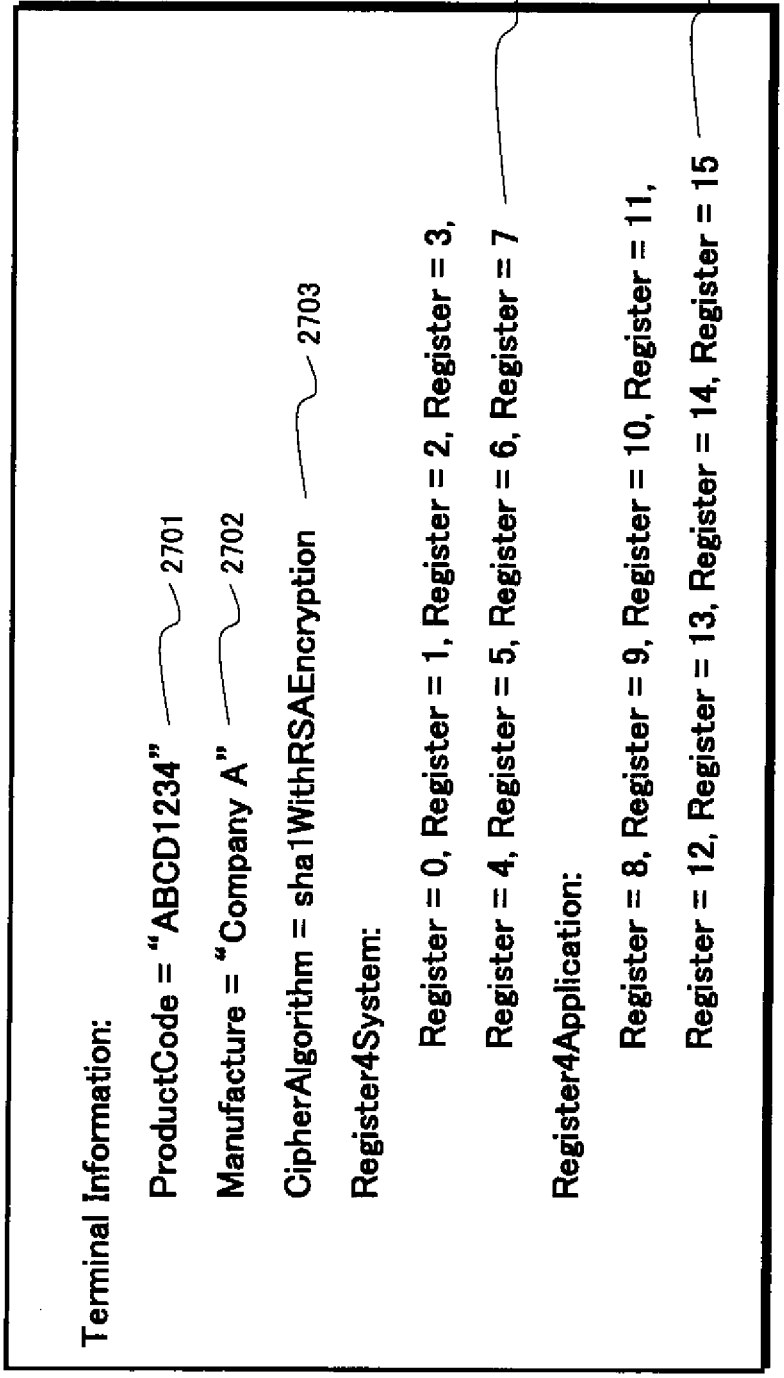
FIG. 27 shows one example of contents of data that is set as terminal information of the certificate A1 according to the Embodiment 1 of the present invention.

FIG. 27 shows contents of the terminal information 608 in the ASN. 1 format.

In this case, "ProductCode="ABCD1234"" (2701) indicates that "the model name of the terminal device A100 is "ABCD1234". Also, "Manufacture="Company A"" (2702) indicates that "the manufacturer's name of the terminal device A100 is "Company A". Furthermore, "Cipher Algorithm=sha1WithRSAEncryption" (2703) indicates that "the terminal device A100 supports SHA1 as an algorithm for a hash operation, and RSA encryption as an algorithm for public key encryption. Also, "Register4System: Register=0, Register=1, Register=2, Register=3, Register=4, Register=5, Register=6, Register=7" (2704) indicates registers for the system in the state information holding unit 210 of the terminal device A (100). Furthermore, "Register4Application: Register=8, Register=9, Register=10, Register=11, Register=12, Register=13, Register=14, Register=15" (2705) indicates registers for the application of the state information holding unit 210 of the terminal device A (100). In practice, the aforementioned information pieces are encoded using TLV encoding, according to BER or DER, so as to obtain binary data. Then, the binary data is set as the terminal information 608.

A detailed description of the registers for the system and the application in the state information holding unit 210 is provided in a description of the state information holding unit 210 below (see FIG. 7).

The issuer's signature 609 is an electronic signature by an issuer, which is generated for information including the version 601, the algorithm ID 602, the issuer 603, the effective period 604, the subject 605, the public key A1 (606), the usage condition 607 of the private key A1 (506), and the terminal information 608.

FIG. 6B shows a data structure of the certificate A2 (513), which is a certificate of the public key A2.

The certificate A2 (513) includes a version 611, an algorithm ID (612), an issuer 613, an effective period 614, a subject 615, a public key A2 (616), a usage condition 617 of the private key A2 (516), and an issuer's signature 619.

The version 611 shows a version of a data structure of the certificate. The algorithm ID 612 shows an encryption algorithm of the private key A2. The issuer 613 shows an issuer of the certificate. In the present embodiment, the issuer 613 shows the manufacturer of the terminal device A100. The effective period 614 shows an effective period of the certificate. The subject 615 is a subject of the certificate A2 (513) that certifies the terminal device A100. The usage condition 617 shows attributes pertaining to the usage conditions of the public key A2 (616) and the private key A2 (516). The usage condition 617 includes information indicating the usage condition of the private key A2 (516). The information reads: "The private key A2 (516) has been encrypted. The private key A2 (516) that has been encrypted is decryptable only when the secure boot of the terminal device A100 is completed, and the application module X that has been started is valid". The information is in the form of text data or binary data such as data encoded using XML or ASN.1.

Figure 26B:
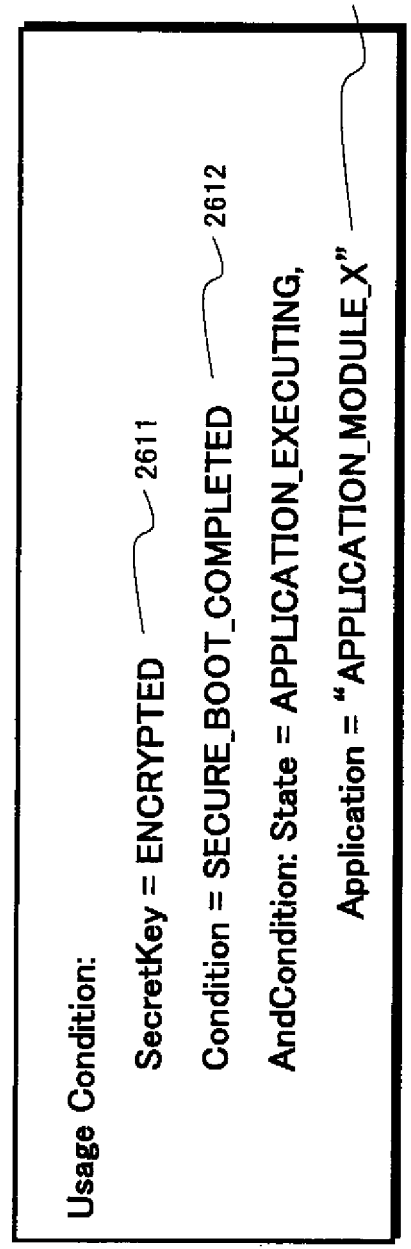
FIG. 26B shows one example of contents of data that is set as a usage condition of the certificate A2 according to the Embodiment 1 of the present invention.

FIG. 26B schematically shows contents of data in a case where the usage condition 617 is set in the ASN.1 format.

In this case, "SecretKey=ENCRYPTED" (2611) indicates that "the private key A2 (516) has been encrypted". Also, "Condition=SECURE#BOOT#COMPLETED" (2612) and "AndCondition: State=APPLICATION#EXECUTING, Application="APPLICATION#MODULE#X"" (2613) indicates that "the private key A2 (516) is decryptable only when the secure boot of the terminal device A100 is completed, and the application module X that has been started is valid". In practice, the aforementioned information pieces are encoded using TLV (Tag Length Value) encoding, according to BER (Basic Encoding Rules) or DER (Distinguished Encoding Rules), so as to obtain binary data. Then, the binary data is set as the usage condition 617.

The issuer's signature 619 is an electronic signature by an issuer, which is generated for information including the version 611, the algorithm ID 612, the issuer 613, the effective period 614, the subject 615, the public key A2 (616), and the usage condition 617 of the private key A2 (516).

Next, a description is provided of the security module 204. Specifically, the security module 204 is realized by, for example, a TPM whose specification is developed by a TCG. However, it is not limited to such. For example, the security module 204 may be realized by another tamper-resistant hardware module or a tamper-resistant software module that has equivalent functions.

The authentication processing unit 206 controls authentication processing with the terminal device B101. The communication unit 207 performs wired or wireless communications with the terminal device B101. The module update unit 208 updates a module stored in the module storage unit 201. The key information update unit 209 updates an encrypted key held in the key information holding unit 205.

Figure 7:
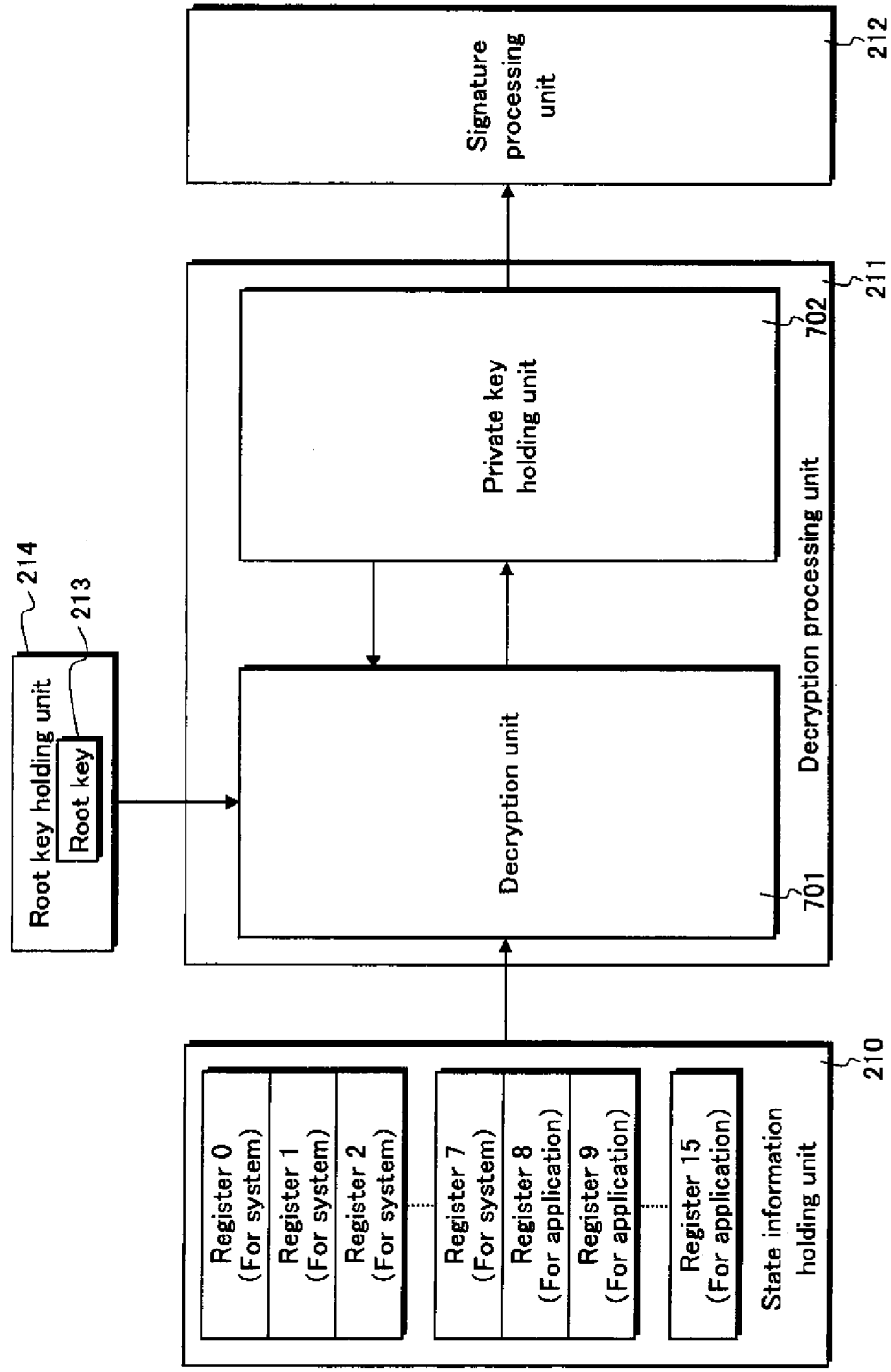
FIG. 7 is a block diagram showing a structure of a security module of the terminal device A according to Embodiment 1 of the present invention.

FIG. 7 shows in detail an inner structure of the security module 204.

The state information holding unit 210 includes 16 registers, i.e., registers 0 (zero) to 15. The registers 0 to 7 hold information pertaining to the startup state of system modules that are to be started in the terminal device A100. Specifically, at the time of starting up any of the system modules in secure boot, a cumulative operation is performed by the module startup control unit 202 so as to add the module measurement value 402 in the module certificate of the started software module to a value stored in any of the registers 0 to 7 used for the system. The registers 8 to 15 hold information pertaining to the startup state of an application module that is to be started in the terminal device A100. Specifically, at the time of starting either the application module X or the application module Y, a cumulative operation is performed by the module startup control unit 202 so as to add the module measurement value 402 in the module certificate of the started software module to a value stored in any of the registers 8 to 15 used for the application. As a result, each of the registers 0 to 15 holds a cumulative value calculated from the hash values of the started software modules.

The decryption processing unit 211 includes a decryption unit 701 and a private key holding unit 702. The decryption unit 701 performs processing for decrypting an encrypted key. The private key holding unit 702 temporarily holds a private key that has been decrypted. The private key held in the private key holding unit 702 is used for the decryption processing in the decryption unit 701 and the processing for generating an electronic signature in the signature processing unit 1.1.2. Terminal Device B101

FIG. 3 shows a structure of the terminal device B101 according to Embodiment 1 of the present invention.

The terminal device B101 includes a module storage unit 301, a module startup control unit 302, a module execution unit 303, an authentication processing unit 306, and a communication unit 307. The module storage unit 301 stores software modules executed by the terminal device B101. The module startup control unit 302 controls the startup of the software modules stored in the module storage unit 301. The module execution unit 303 provides an execution environment for the software modules started by the module startup control unit 302. The authentication processing unit 306 controls authentication processing with the terminal device A100. The communication unit 307 performs wired or wireless communications with the terminal device A100.

The authentication processing unit 306 holds information for analyzing the data structure of the certificate A2 (513) described above, and a public key (not shown) of the manufacturer of the terminal device A100. The public key is used for verifying the validity of the certificate A2 (513). The public key of the manufacturer of the terminal device A100 is a public key in the RSA encryption method. The public key corresponds to a private key that is of the manufacturer of the terminal device A100, and that has been used for the generation of a signature provided for the certificate A2.

1.2. Operation 1.2.1. Authentication Processing

Figure 8:
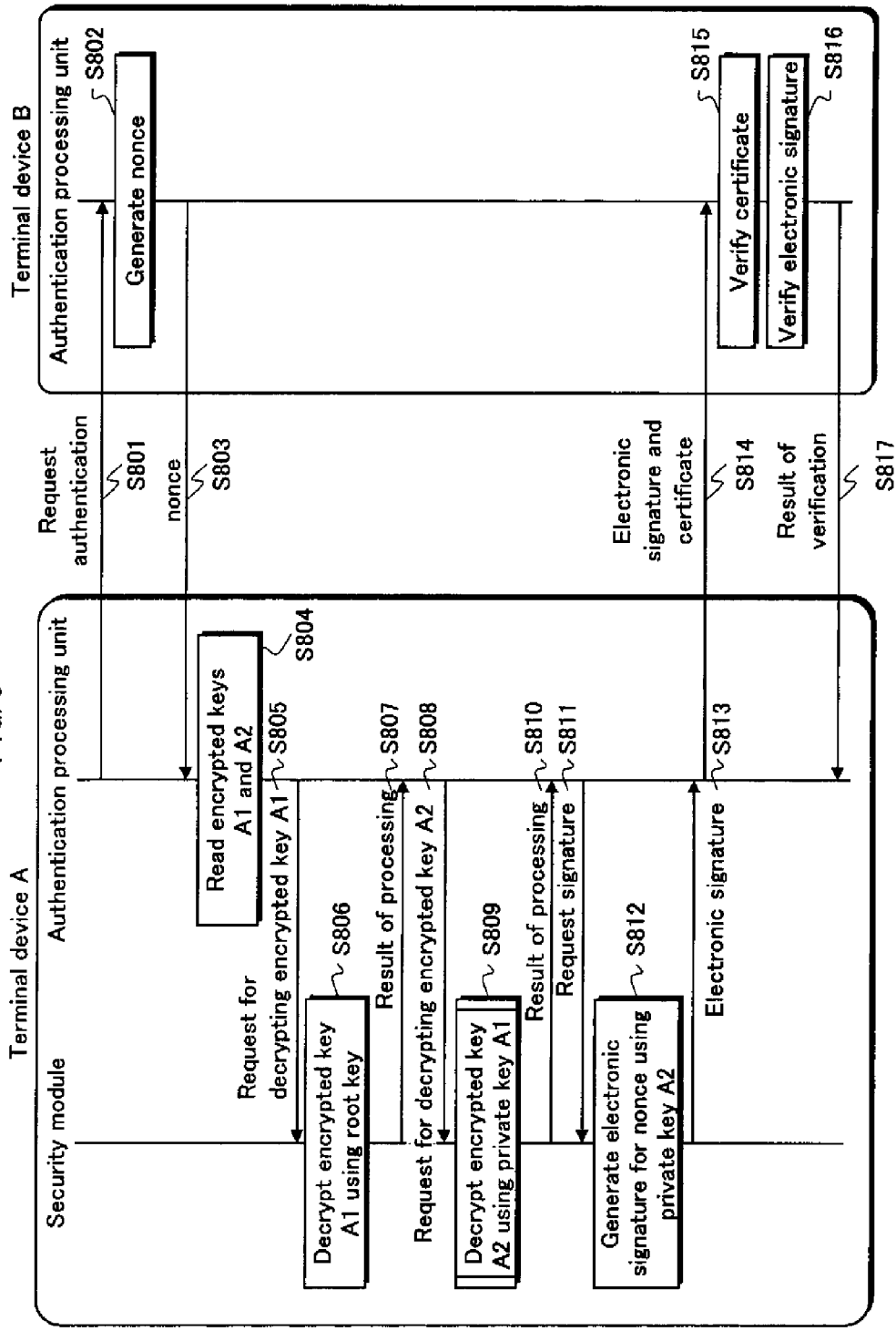
FIG. 8 is a sequence diagram of authentication processing in which the terminal device B authenticates the terminal device A according to Embodiment 1 of the present invention.

The following describes a sequence of authentication processing between the terminal device A100 in which the application module X is started and the terminal device B101, with reference to FIG. 8.

First, the authentication processing unit 206 of the terminal device A100 transmits, to the terminal device B101, a message for requesting authentication processing (S801). Subsequently, the authentication processing unit 306 of the terminal device B101 starts authentication processing with the terminal device A100, generates a nonce, which is a random character string (S802), and transmits the nonce to the terminal device A100 (S803). Upon receiving the nonce, the authentication processing unit 206 of the terminal device A100 reads the encrypted key A2 (512), the certificate A2 (513), and the encrypted key A1 (502) from the key information holding unit 205 (S804). Then, the authentication processing unit 206 requests the security module 204 to decrypt the encrypted key A1 (502) (S805).

The decryption processing unit 211 of the security module 204 performs processing for decrypting the encrypted key (A1) using the root key 213 (S806), and transmits a result of the decryption processing to the authentication processing unit 206 (S807). At this time, the security module 204 extracts the decryption condition A1 (505) by decrypting the encrypted key A1 (502), and compares a value held in a register of the state information holding unit 210 with the decryption condition A1 (505). When the comparison is successful, that is, when the value matches the decryption condition A1 (505), the security module 204 transmits a result of processing indicating that the decryption processing is successful to the authentication processing unit 206. When the comparison is not successful, that is, when the value in the register of the state information holding unit 210 does not match the decryption condition A1 (505), the security module 204 transmits a result of processing indicating that the decryption processing is not successful to the authentication processing unit 206. When a result of the processing in step S807 indicates that the comparison is not successful, the authentication processing unit 206 aborts the authentication processing. When a result of the processing in step S807 is successful, the authentication processing unit 206 requests the security module 204 to decrypt the encrypted key A2 (S808).

The decryption processing unit 211 of the security module 204 performs processing for decrypting the encrypted key A2 using the private key A1 that is obtained in the decryption processing in step S806 (S809), and transmits a result of the decryption processing to the authentication processing unit 206 (S810). In this decryption processing, the security module 204 extracts the decryption condition A2 (515) by decrypting the encrypted key A2 (512), and compares a value held in a register of the state information holding unit 210 with the decryption condition A2 (515). When the comparison is successful, that is, when the value matches the decryption condition A2 (515), the security module 204 transmits a result of processing indicating that the decryption processing is successful to the authentication processing unit 206. When the comparison is not successful, that is, when the value in the register of the state information holding unit 210 does not match the decryption condition A2 (515), the security module 204 transmits a result of processing indicating that the decryption processing is not successful to the authentication processing unit 206. Details of the decryption processing in step S809 are provided below.

When a result of the processing in step S810 indicates that the comparison is not successful, the authentication processing unit 206 aborts the authentication processing. When a result of the processing in step S810 is successful, the authentication processing unit 206 requests the security module 204 to perform processing for generating an electronic signature for the nonce using the private key A2 (S811). The security module 204 performs processing for generating the electronic signature for the nonce using the private key A2 decrypted in step S809 (S812), and transmits the electronic signature to the authentication processing unit 206 (S813). Specifically, the signature processing is processing for generating a hash value of the nonce, and encrypting the hash value using the private key A2. Upon receiving the electronic signature, the authentication processing unit 206 transmits the electronic signature and the certificate A2 to the terminal device B101 (S814).

The terminal device B101 verifies the certificate A2, which is received by the authentication processing unit 306, using the public key of the manufacturer of the terminal device A100 (S815). Furthermore, the terminal device B101 verifies whether the electronic signature has been generated for the nonce using the private key A2, using the public key A2 (616) included in the certificate A2 that has been verified (S816). Then, the terminal device B101 transmits a result of the verification to the terminal device A100, and the authentication processing unit 206 of the terminal device A100 receives the result of the verification, whereby the authentication processing is ended (S817). Specifically, in the verification of the electronic signature in step S816, the authentication processing unit 306 generates the hash value of the nonce that is transmitted to the terminal device A100 in step S803. Then, the authentication processing unit 306 decrypts the electronic signature received from the terminal device A100, using the public key A2 (616), and compares the decrypted electronic signature with the hash value of the nonce. In step S812, the signature is generated from the hash value of the nonce. However, it is possible to directly encrypt the nonce using the private key A2, without generating the hash value thereof. In this case, the following processing may be performed in step S815. That is, the terminal device B101 may decrypt the encrypted nonce using the public key A2 (616), and compare the value of the decrypted nonce with the value of the nonce transmitted to the terminal device A100 in step S803 to verify whether the values match each other.

1.2.2. Processing for Decrypting Encrypted Key A2

The following describes in detail the processing of step S809 in FIG. 8, namely the processing for decrypting the encrypted key A2 using the private key A1.

Figure 9:
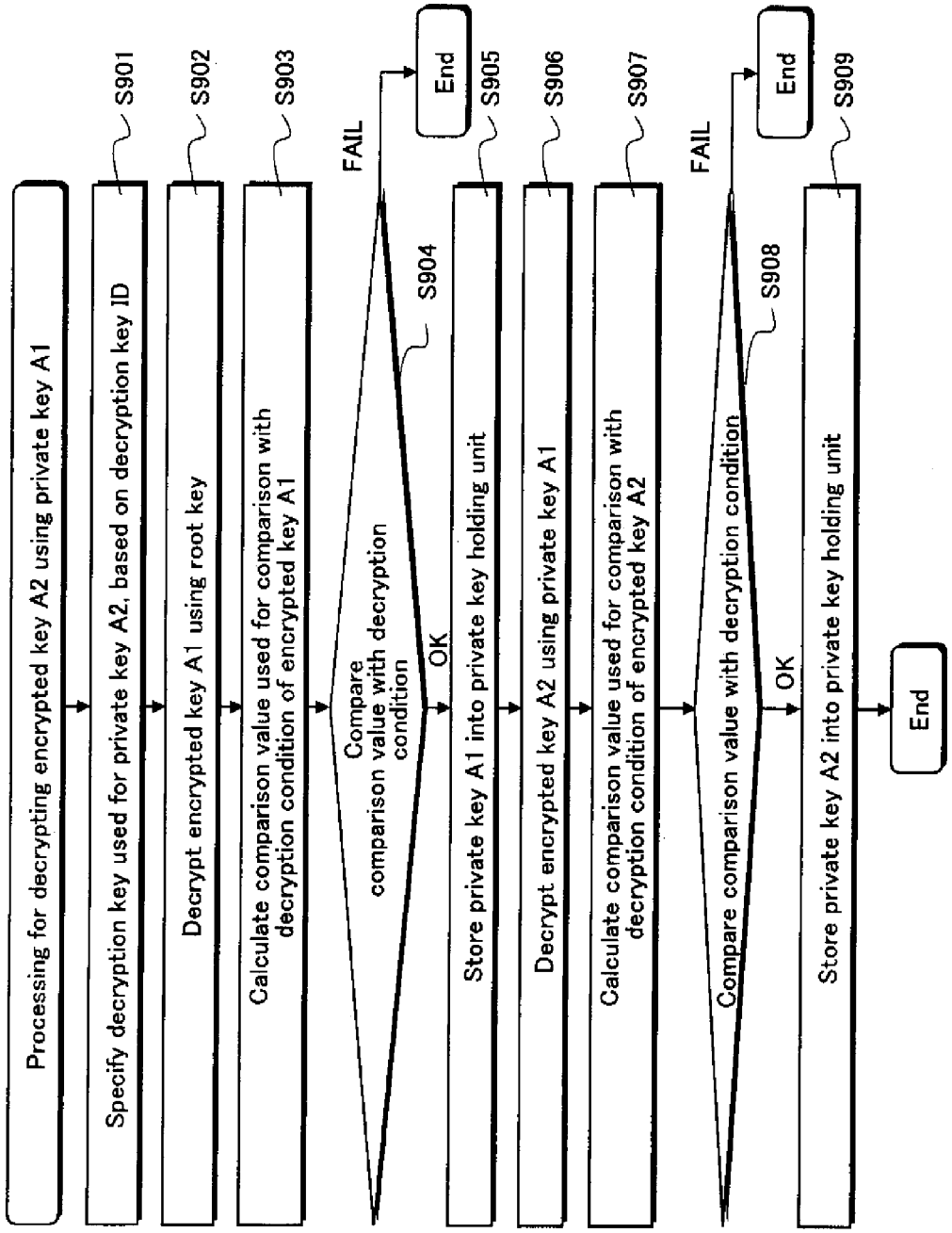
FIG. 9 is a flow diagram of decryption processing of an encrypted key A2 according to Embodiment 1 of the present invention.

FIG. 9 is a flow diagram showing in detail the processing for decrypting the encrypted key A2 using the private key A1.

First, the authentication processing unit 206 specifies that the private key A1 (506), which is indicated by the decryption key ID 514 included in the key information 510 held by the key information holding unit 205, is a decryption key used for decrypting the encrypted key A2 (512) (S901). Then, based on the request from the authentication processing unit 206, the decryption unit 701 of the security module 204 acquires the private key A1 (506) by decrypting the encrypted key A1 (502) using the root key 213 (S902). Furthermore, the decryption unit 701 acquires a comparison value used for comparison with the decryption condition A1 (505), with reference to a register in the state information holding unit 210 (S903), and compares the acquired comparison value with the decryption condition A1 (505) (S904). When the comparison value does not match the decryption condition A1 (S904: FAIL), the terminal device A100 is in a state different from a state where secure boot has been completed. Accordingly, the security module 204 deletes the data decrypted in step S902, transmits a result of the comparison as a failure in the decryption processing to the authentication processing unit 206, and aborts the decryption processing. When the comparison value matches the decryption condition A1 (S904: OK), the terminal device A100 is in the state where secure boot has been completed. Accordingly, the security module 204 stores, in the private key holding unit 211, the private key A1 decrypted in step S902, and transmits a result of the comparison as a success in the decryption processing to the authentication processing unit 206 (S905).

Then, based on the request from the authentication processing unit 206, the decryption unit 701 of the security module 204 acquires the private key A2 by decrypting the encrypted key A2 using the private key A1 held in the private key holding unit 211 (S906). Furthermore, the decryption unit 701 acquires a comparison value used for comparison with the decryption condition A2 (515), with reference to a register in the state information holding unit 210 (S907), and compares the acquired comparison value with the decryption condition A2 (515) (S908). When the comparison value does not match the decryption condition A2 (S908: FAIL), the terminal device A100 is in a state different from a state where the application module X that has been started is valid. Accordingly, the security module 204 deletes the data decrypted in step S906, transmits a result of the comparison as a failure in the decryption processing to the authentication processing unit 206. When the comparison value matches the decryption condition A2 (S908: OK), the terminal device A100 is in the state where the application module X that has been started is valid. Accordingly, the security module 204 stores, in the private key holding unit 211, the private key A2 decrypted in step S906, and transmits a result of the comparison as a success in the decryption processing to the authentication processing unit 206 (S909). Here, in order to acquire the private key A2 (516) by decrypting the private key A2 (516) that has been encrypted, and to start the processing for generating the signature in step S812 using the private key A2 (516), the following two conditions need to be satisfied: secure boot by the terminal device A100 has been completed; and the application X started by the terminal device A100 is valid. In other words, by verifying the validity of the electronic signature generated in step S816 for the nonce using the private key A2, the terminal device B101 can verify that secure boot in the terminal device A100 is completed and the application module X that has been started in the terminal device A100 is valid. In this way, the terminal device B101 can verify that the application module X has been started successfully without managing the comparison value of the application module X. At the same time, since being capable of verifying that the terminal device A100 has completed secure boot processing, the terminal device B101 can verify that the system modules of the terminal device A100 have been started successfully without managing the comparison values of the respective system modules.

1.2.3. Processing for Updating Key Information

Figure 10:
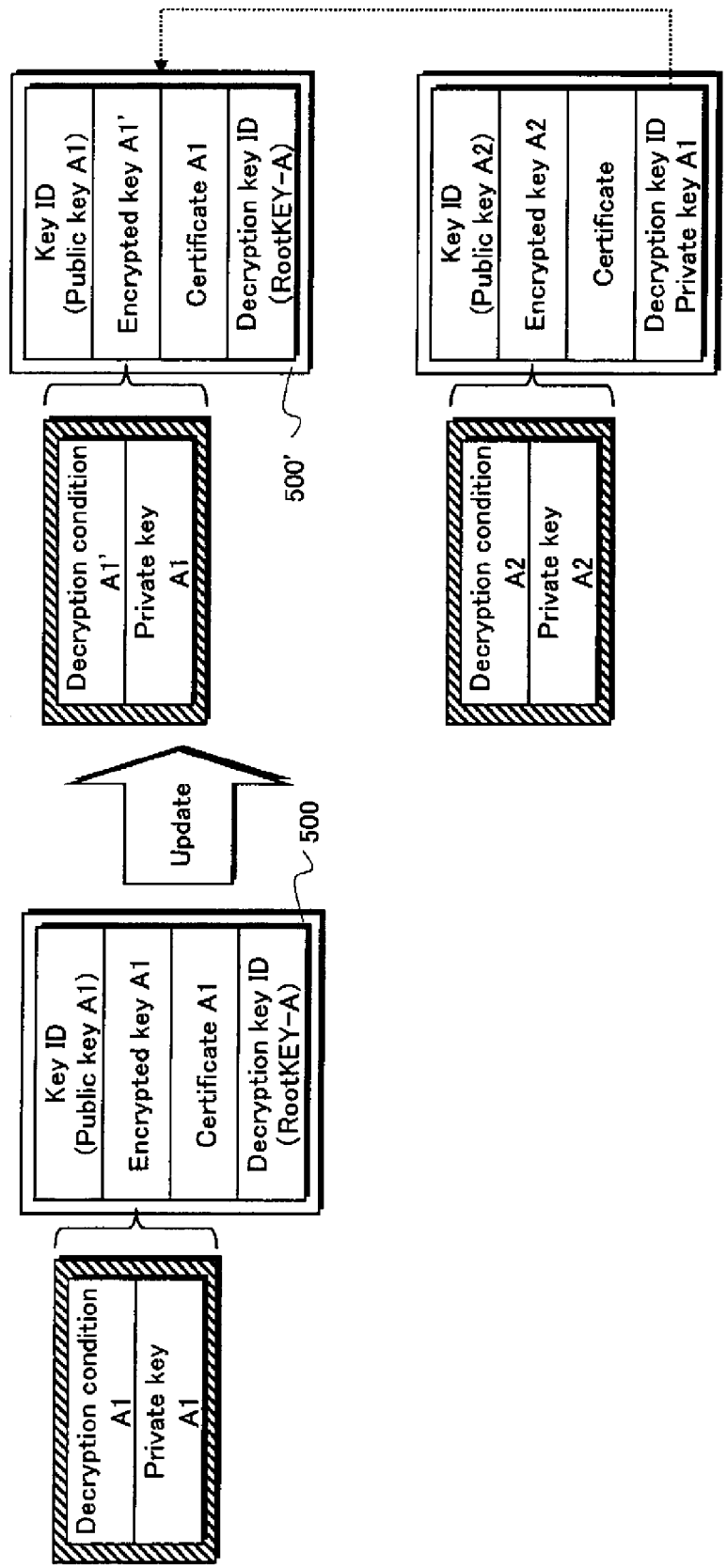
FIG. 10 is a schematic diagram showing update processing of the key information held in the key information holding unit of the terminal device A according to Embodiment 1 of the present invention.

FIG. 10 schematically shows processing for updating the key information 500, which is performed by the key information update unit 209 of terminal device A100 according to Embodiment 1 of the present invention.

The key information 500 is updated when any of the system modules is updated.

In updating the key information 500, the terminal device A100 downloads the system module to be updated and new key information 500', from the manufacturer of the terminal device A100 via the communication unit 207. The key information 500' is obtained by updating the decryption condition A1 of the key information 500 to a decryption condition A1'. However, even when any of the system modules is updated, the private key A1 and the root key RootKEY-A in the key information 500 do not need to be updated and remain the same. Owing to the updating method as described above, update processing is completed by only updating the key information 500, while other information such as the key information 510 remains unaffected by the update of the system module. In particular, key information is divided into two pieces of key information in the present embodiment, namely, the key information 500 corresponding to the system modules (i.e., modules to be started before initiating the OS) and the key information 510 corresponding to an application. Therefore, even when any of the system modules is updated, a provider of the application does not need to perform any update operation. This makes it possible to separate operations performed by the provider of the application and a provider of the system modules. Generally, the provider of the application is different from the provider of the system modules. Therefore, separating the operations between the respective providers greatly saves trouble in system maintenance.

2. Embodiment 2

The following describes Embodiment 2 of the present invention.

Embodiment 2 is different from Embodiment 1 with respect to pairing processing described below. The pairing processing is performed so that the terminal device A100 can perform the same authentication processing as that performed with the terminal device B101, with another terminal device (i.e., terminal device C102). As a result of the pairing processing between the terminal device A100 and the terminal device C102, new key information is set in the terminal device A100. The new key information is equivalent to the key information 510 in Embodiment 1. The decryption condition in the new key information indicates that the system modules and the application Y that are started in the terminal device A100 are valid. By setting the new key information in the terminal device A100 as described above, the terminal device A100 can perform authentication processing with the terminal device C102, under the condition that the system modules and the application module in the terminal device A100 are valid.

Figure 11:
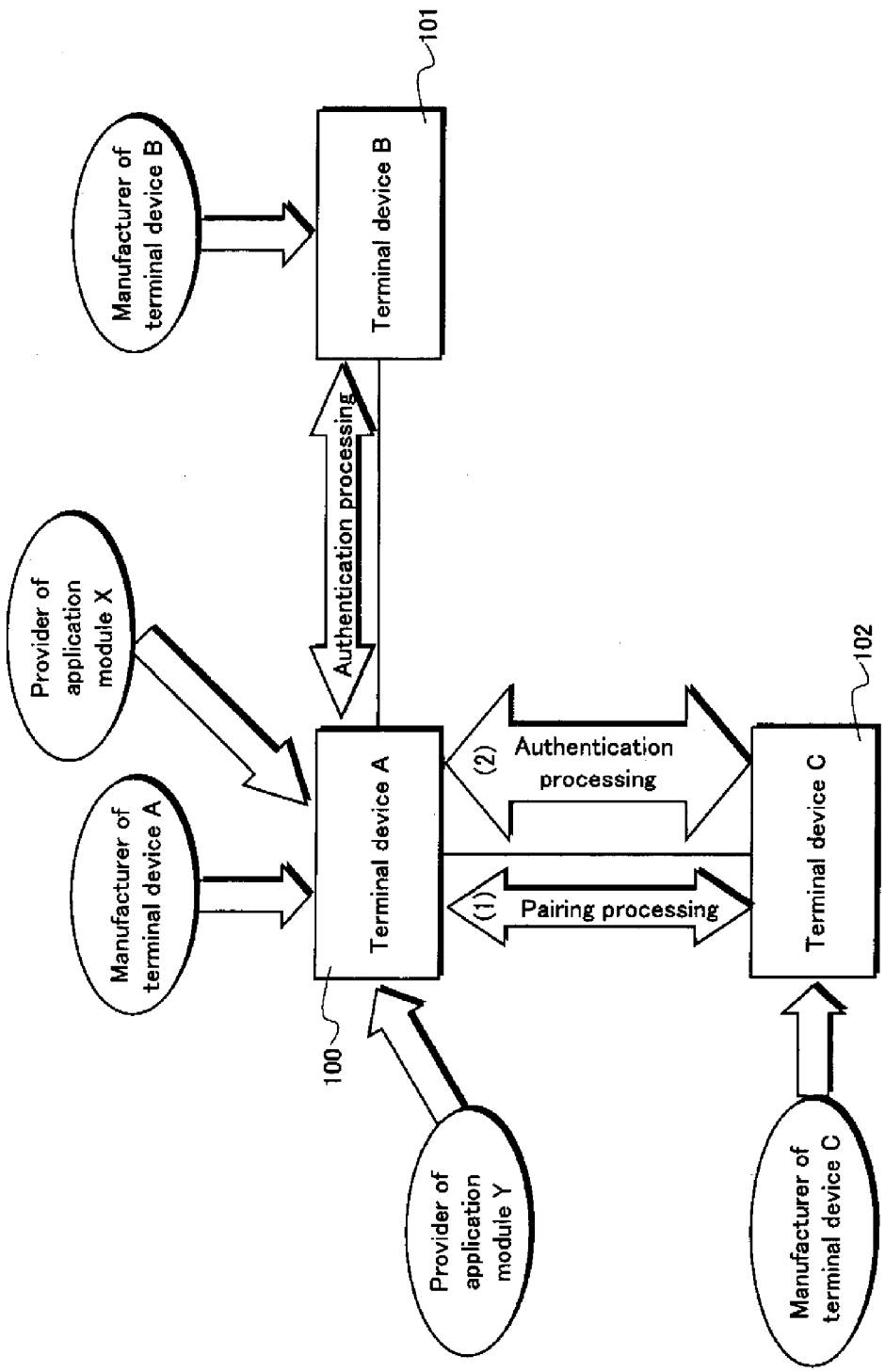
FIG. 11 is a block diagram showing a system structure according to Embodiment 2 of the present invention.

FIG. 11 shows a system structure according to Embodiment 2 of the present invention.

The system structure according to Embodiment 2 includes the terminal devices A100, B101, and C102. The terminal devices A100 and B101 are the same as Embodiment 1. The terminal device C102 performs pairing processing and authentication processing with the terminal device A100. Here, it is assumed that the application module Y is downloaded to the terminal device A100 after the shipment of the terminal device A100. The application module Y is downloaded by a user of the terminal device A100 from a server of the provider of the application module Y. Also, it is assumed that an encrypted key only decryptable when the application module Y has been started is not preset in the terminal device A100.

Figure 25:
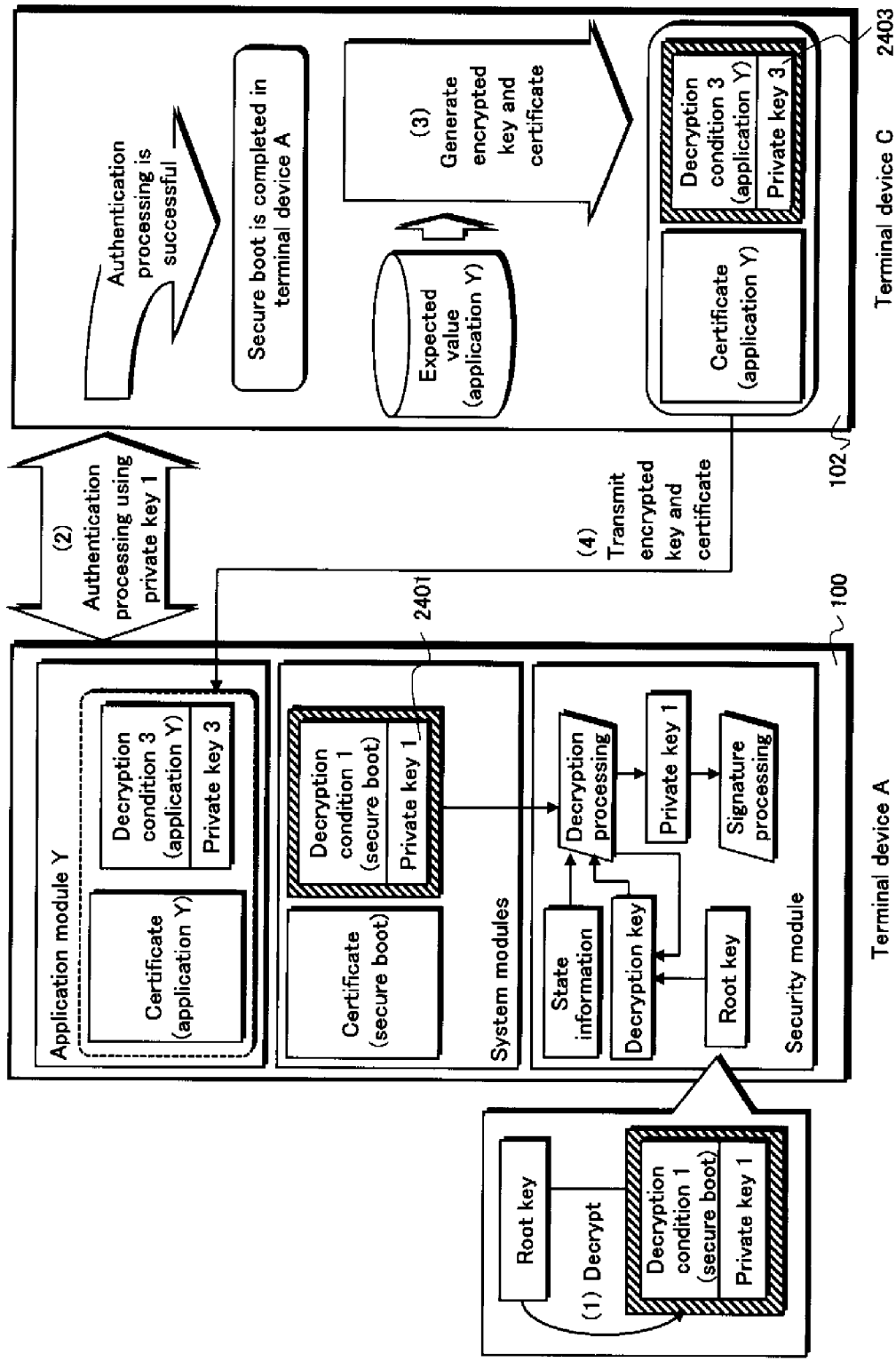
FIG. 25 shows a mechanism of pairing processing between the terminal device A and the terminal device C according to Embodiment 2 of the present invention.

FIG. 25 schematically shows the pairing processing performed between the terminal device A100 and the terminal device C102 in the present invention.

The terminal device A100 holds a private key 1 (2401) that has been encrypted. A detailed description of the private key 1 (2401) is provided above in Embodiment 1. First, the authentication processing unit 206 of the terminal device A100 decrypts the private key 1 (2401) that has been encrypted, and performs the authentication processing with the terminal device C102, using the private key 1 that has been decrypted. Next, the terminal device C102 generates an encrypted key by encrypting the private key 3 (2403) together with an expected value of when the application module Y is started in the terminal device A100. Furthermore, the terminal device C102 generates a certificate of a public key corresponding to the private key 3 (2403). Then, the terminal device C 102 transmits the encrypted key and the certificate that have been generated to the terminal device A100. A detailed description of operations for generating the encrypted key is provided below. Upon completing the transmission of the encrypted key and the certificate to the terminal device A100, the terminal device C102 can start authentication processing with the terminal device A100, in the same manner as the authentication processing between the terminal device A100 and the terminal device B101 in Embodiment 1. This authentication processing enables the terminal device C102 to verify whether the application module Y that has been started in the terminal device A100 is valid.

2.1. Structure

Figure 12:
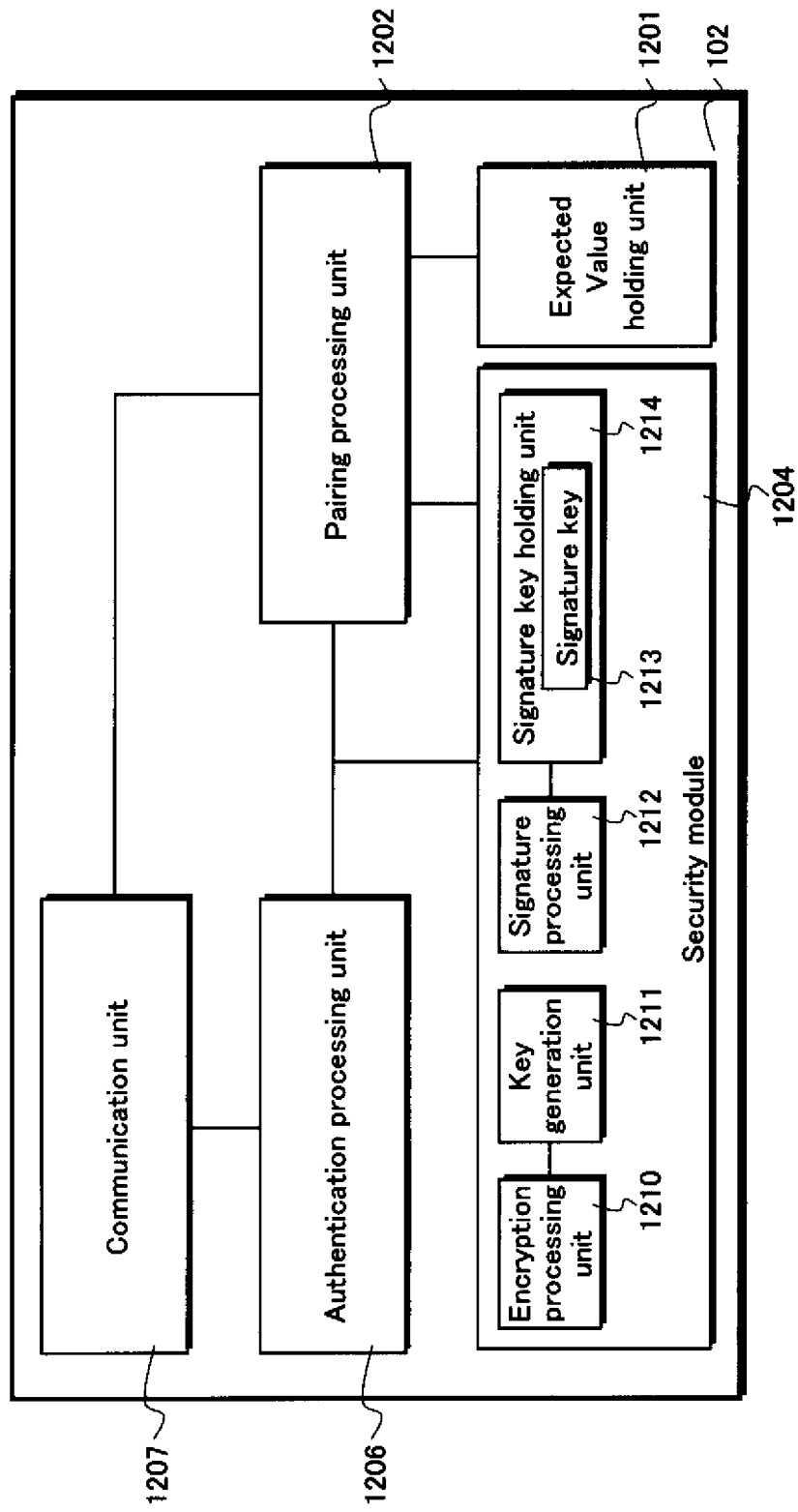
FIG. 12 is a block diagram showing a structure of a terminal device C according to Embodiment 2 of the present invention.

FIG. 12 shows a structure of the terminal device C102 according to Embodiment 2 of the present invention.

The terminal device C102 includes an expected value holding unit 1201, a pairing processing unit 1202, a security module 1204, an authentication processing unit 1206, and a communication unit 1207. The expected value holding unit 1201 holds a database (DB) that contains expected values of application modules that are started in a terminal device on the other end of communications.

FIG. 13 shows a DB of the expected values of the application modules held in the expected value holding unit 1201. The DB contains the names of the application modules, the models of terminal devices, the expected values, and the URLs (Uniform Resource Locator) of providers, which are associated with each other.

The pairing processing unit 1202 controls pairing processing with another terminal device. The pairing processing unit 1202 accesses the providers of the application modules at regular time intervals via the communication unit 1207, based on the URLs in the DB of expected values. When detecting an update of an application module, the pairing processing unit 1202 receives a new expected value, and updates the expected value of the updated application module held in the expected value holding unit 1201 to the new expected value.

The security module 1204 performs processing for generating an encrypted key. The security module 1204 includes a key generation unit 1211, an encryption processing unit 1210, a signature processing unit 1212, and a signature key holding unit 1214. The encryption processing unit 1210 encrypts a generated private key. The signature processing unit 1212 performs signature processing at the time of generating a certificate. The signature key holding unit 1214 holds a signature key 1213 used for the signature processing. The signature key 1213 is a 2048-bit private key in the RSA encryption method.

The authentication processing unit 1206 controls authentication processing with the terminal device A100. The authentication processing unit 1206 holds information for analyzing the data structure of each of the certificates A1 (503) and A2 (513) described above, and a public key (not shown) of the manufacturer of the terminal device A100. The public key is used for verifying the validity of the certificate A1 (503). The public key of the manufacturer of the terminal device A100 is a public key in the RSA encryption method, and corresponds to a private key of the manufacturer of the terminal device A100 that is used for the generation of a signature provided for the certificate A1.

The communication unit 1207 performs wired or wireless communications with the terminal device A100

2.2. Operation 2.2.1 Pairing Processing

Figure 14:
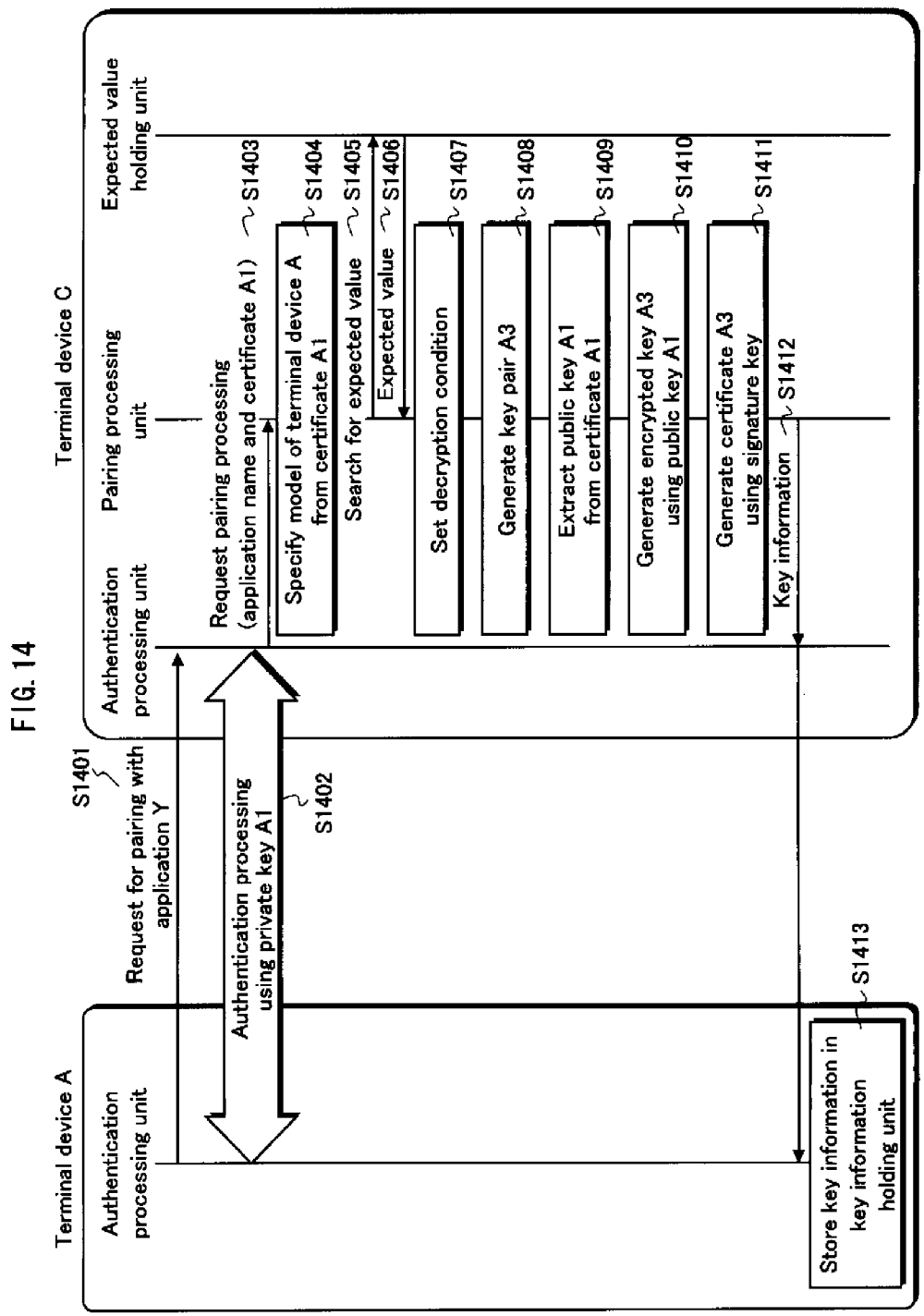
FIG. 14 is a sequence diagram of processing for pairing the terminal device A with the terminal device C according to Embodiment 2 of the present invention.

The following describes a sequence of the pairing processing between the terminal device A100 and the terminal device C102, with reference to FIG. 14.

In this pairing processing, authentication is performed under the condition that the application module Y has been started in the terminal device A100. First, the authentication processing unit 206 of the terminal device A100 transmits, to the terminal device C102, a message for requesting pairing with the application module Y (S1401). At this time, the message includes an application name that identifies the application module Y. Upon transmission of the message, authentication processing using the private key A1 (505) is performed between the terminal device A100 and the terminal device C102 (S1402). Details of the authentication processing are described below. If the authentication processing fails, the pairing processing is aborted. If the authentication processing is successful, the authentication processing unit 1206 of the terminal device C102 transmits a request for pairing processing to the pairing processing unit 1202 (S1403). The request for pairing processing includes the name of the application module Y and the certificate A1 (503) of the public key A1, which is acquired in the authentication processing in step S1402.

Upon receiving the certificate A1 (503), the pairing processing unit 1202 specifies the model of the terminal device A100 from a model name included in the terminal information 608 in the certificate A1 (503) (S1404). Next, the pairing processing unit 1202 searches the DB of expected values held in the expected value holding unit 1201 for an expected value of when the terminal device A100 executes the application module Y, using the application name received in step S1403 and the model name specified in step S1404 as search keys (S1405). Then, the pairing processing unit 1202 acquires the expected value as a result of the search (S1406). If the expected value of when the terminal device A100 executes the application module Y is not registered in the DB of expected values held in the expected value holding unit 1201, the pairing processing unit 1202 receives a search error as a result of the search in step S1406, and the pairing processing is aborted. Upon receiving the expected value of when the terminal device A100 executes the application module Y from the expected value holding unit 1201, the pairing processing unit 1202 sets the expected value as a decryption condition A3 (525) (S1407). As described above, since the expected value holding unit 1201 pre-stores therein the expected value of when the terminal device A100 executes the application module Y, the terminal device C102 does not need to acquire the expected value from the terminal device A100.

Furthermore, the pairing processing unit 1202 generates a key pair consisting of a private key A3 (526) and a public key A3 (1806) corresponding to the private key A3 (526) (S1408). The private key A3 (526) is a key for an algorithm in a public key encryption method, which is included in the information on encryption algorithms supported by the terminal device A100 in the terminal information 608 of the certificate A1 (503). Subsequently, the pairing processing unit 1202 extracts the public key A1 (606) from the certificate A1 (503) that has been received (S1409), and generates an encrypted key A3 (522) by encrypting the private key A3 (526) together with the decryption condition A3 (525), using the public key A1 (606) (S1410). Then, the pairing processing unit 1202 generates a certificate A3 (523), which is a certificate of the public key A3 corresponding to the private key A3, using the signature key 1213 (S1411). At this time, the pairing processing unit 1202 sets a value indicating the terminal device A100 to the subject of the certificate A3 (523), which is the same value set to the subject of the certificate A1 (503).

The following describes the certificate A3 (523).

Figure 18:
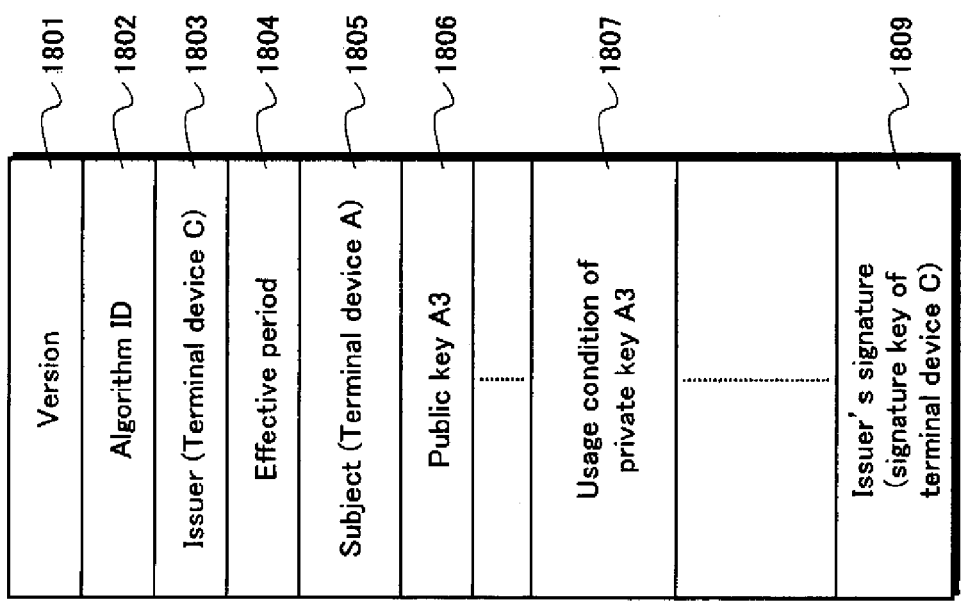
FIG. 18 shows a data structure of a certificate A3 according to Embodiment 2 of the present invention.

FIG. 18 shows a data structure of the certificate A3 (523).

The certificate A3 includes a version 1801, an algorithm ID 1802, an issuer 1803, an effective period 1804, a subject 1805, a public key A3 (1806), a usage condition 1807 of the private key A3 (526), and an issuer's signature 1809.

The version 1801 shows a version of a data structure of the certificate A3. The algorithm ID 1802 shows an encryption algorithm of the private key A3. The issuer 1803 shows a user of the terminal device C102, who is an issuer of the certificate. The effective period 1804 shows an effective period of the certificate. The subject 1805 indicates the terminal device A100, which is a subject of the certificate A3 (523). The usage condition 1807 shows an attribute pertaining to the usage condition of the private key A3 (526). The usage condition 1807 includes information indicating the usage condition of the private key A3 (526). The information reads: "The private key A3 (526) has been encrypted. The private key A3 (526) that has been encrypted is decryptable only when the secure boot of the terminal device A100 is completed, and the application module Y that has been started is valid". The information is in the form of text data, XML, or binary data. The issuer's signature 1809 is an electronic signature by an issuer, which is generated for information including the version 1801, the algorithm ID 1802, the issuer 1803, the effective period 1804, the subject 1805, the public key A3 (1806), and the usage condition 1807 of the private key A3 (526). This concludes a description of the certificate A3 (523). Referring back to FIG. 14, the description of the pairing processing is continued.

The pairing processing unit 1202 generates key information 520, and transmits the key information 520 to the terminal device A100 (S1412). Here, the key information 520 includes the encrypted key A3 (522) and the certificate A3 (523) that have been generated, a key ID 521 of the encrypted key A3 (522), and a decryption key ID (524). The authentication processing unit 206 of the terminal device A100 receives the key information, and stores the key information into the key information holding unit 205 (S1413), and ends the pairing processing. As a result, the key information holding unit 205 of the terminal device A100 holds the key information 520 that includes the encrypted key A3 (522) used for the authentication processing with the terminal device C102, and the certificate A3 (523) of the public key A3 (1806), in addition to the encrypted key A1 (502) and the encrypted key A2 (512) according to Embodiment 1. The private key A3 (526) that has been encrypted in the encrypted key A3 (522) is decrypted only when the secure boot of the terminal device A100 is completed, and the application module Y that has been started is valid.

Figure 19:
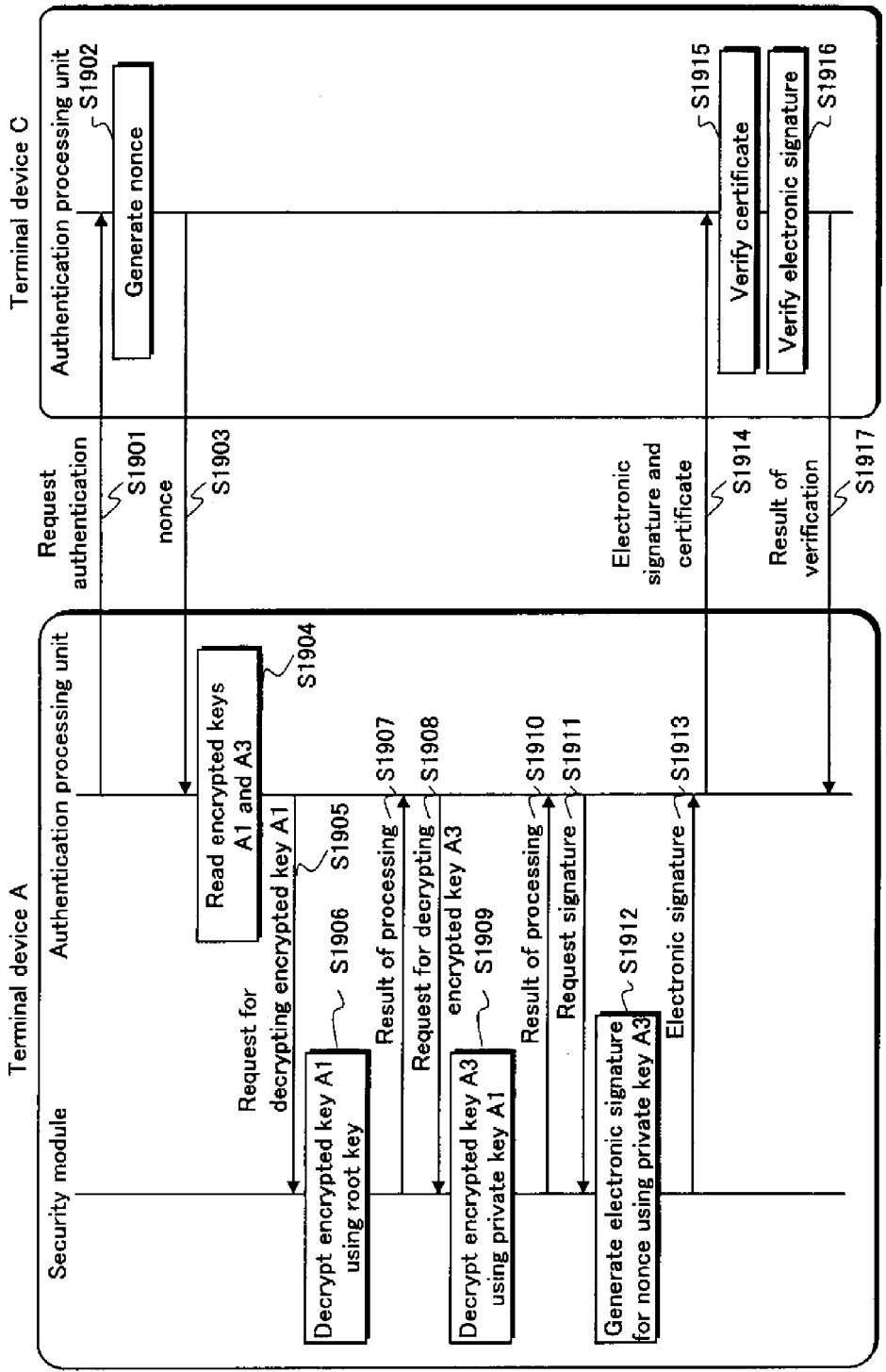
FIG. 19 is a sequence diagram of authentication processing in which the terminal device C authenticates the terminal device A according to Embodiment 2 of the present invention.

After the pairing processing is completed, the terminal device A100 can perform authentication processing with the terminal device C102 using the encrypted key A3 and the certificate A3, as shown in FIG. 19. The authentication processing shown in FIG. 19 is the same as the authentication processing shown in FIG. 8 according to Embodiment 1, except that the encrypted key and the certificate used in the authentication processing is replaced with the encrypted key A3 and the certificate A3, and that the terminal device B101 is replaced with the terminal device C102. A further description of FIG. 19 is omitted as it is the same as that of FIG. 8.

2.2.2. Authentication Processing

Figure 15:
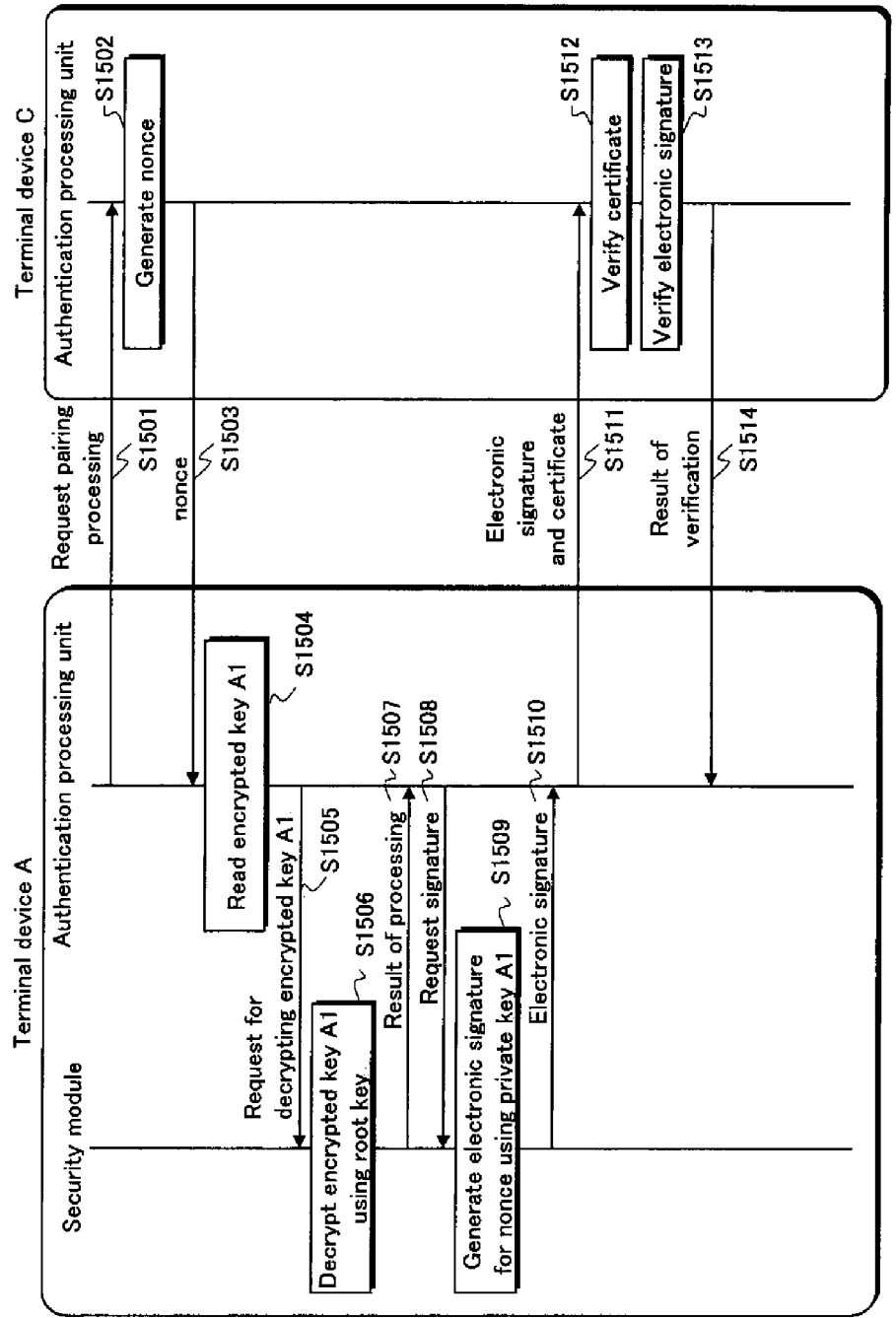
FIG. 15 is a sequence diagram of authentication processing using a private key A1, which is performed in the processing for pairing the terminal device A with the terminal device C according to Embodiment 2 of the present invention.

The following describes authentication processing using the private key A1 that is performed in step S1402 of the pairing processing, with reference to FIG. 15.

First, the authentication processing unit 206 of the terminal device A100 transmits, to the terminal device C102, a message for requesting pairing processing (S1501). Subsequently, the authentication processing unit 1206 of the terminal device C102 starts authentication processing with the terminal device A100, generates a nonce, which is a random character string (S1502), and transmits the nonce to the terminal device A100 (S1503). Upon receiving the nonce, the authentication processing unit 206 of the terminal device A100 reads the encrypted key A1 (502) from the key information holding unit 205 (S1504). Then, the authentication processing unit 206 requests the security module 204 to decrypt the encrypted key A1 (S1505).

The security module 204 performs processing for decrypting the encrypted key (A1) using the root key 213 (S1506), and transmits a result of the decryption processing to the authentication processing unit 206 (S1507). At this time, the security module 204 compares a value held in a register of the state information holding unit 210 with the decryption condition A1 (505). When the decryption of the encrypted key A1 is successful and the comparison is successful, that is, when the value matches the decryption condition A1 (505), the security module 204 transmits a result of processing indicating that the decryption processing is successful to the authentication processing unit 206. When the decryption of the encrypted key A1 is not successful, and the comparison is not successful, that is, when the value in the register of the state information holding unit 210 does not match the decryption condition A1 (505), the security module 204 transmits a result of processing indicating that the decryption processing is not successful to the authentication processing unit 206. When a result of the processing in step S1507 indicates that the decryption processing is not successful, the authentication processing unit 206 aborts the authentication processing. When a result of the processing in step S1507 is successful, the authentication processing unit 206 requests the security module 204 to perform processing for generating an electronic signature for the nonce using the private key A1 (S1508). The security module 204 performs processing for generating the electronic signature for the nonce using the private key A1 decrypted in step S1506 (S1509), and transmits the electronic signature to the authentication processing unit 206 (S1510). Specifically, the signature processing is processing for generating a hash value of the nonce, and encrypting the hash value using the private key A1. Upon receiving the electronic signature, the authentication processing unit 206 transmits the electronic signature and the certificate A1 to the terminal device C102 (S1511).

Upon receiving the certificate A1 and the electronic signature, the terminal device C102 verifies the certificate A1 (S1512), and verifies whether the electronic signature is a signature for the nonce generated using the private key A1, using the public key A1 included in the certificate A1 that has been verified (S1513). Subsequently, the terminal device C102 transmits a result of the verification (S1514) to the terminal device A100 and ends the authentication processing.

Specifically, in the verification of the electronic signature in step S1513, the authentication processing unit 1206 generates the hash value of the nonce that is transmitted to the terminal device A100 in step S1503. Then, the authentication processing unit 1206 decrypts the electronic signature received from the terminal device A100, using the public key A1 (606), and compares the decrypted electronic signature with the hash value of the nonce. In step S1509, the signature is generated from the hash value of the nonce. However, it is possible to directly encrypt the nonce using the private key A1, without generating the hash value thereof. In this case, the following processing may be performed in step S1513. That is, the terminal device C102 may decrypt the encrypted nonce using the public key A1 (606), and compare the value of the decrypted nonce with the value of the nonce transmitted to the terminal device A100 in step S1503 to verify whether the values match each other.

2.2.3. Processing for Decrypting Encrypted Key A1

The following describes in detail the processing for decrypting the encrypted key A1 (502) performed in the terminal device A100, which is the processing of S1506 described above with reference to FIG. 15. This decryption processing is performed during the authentication processing using the private key A1.

Figure 16:
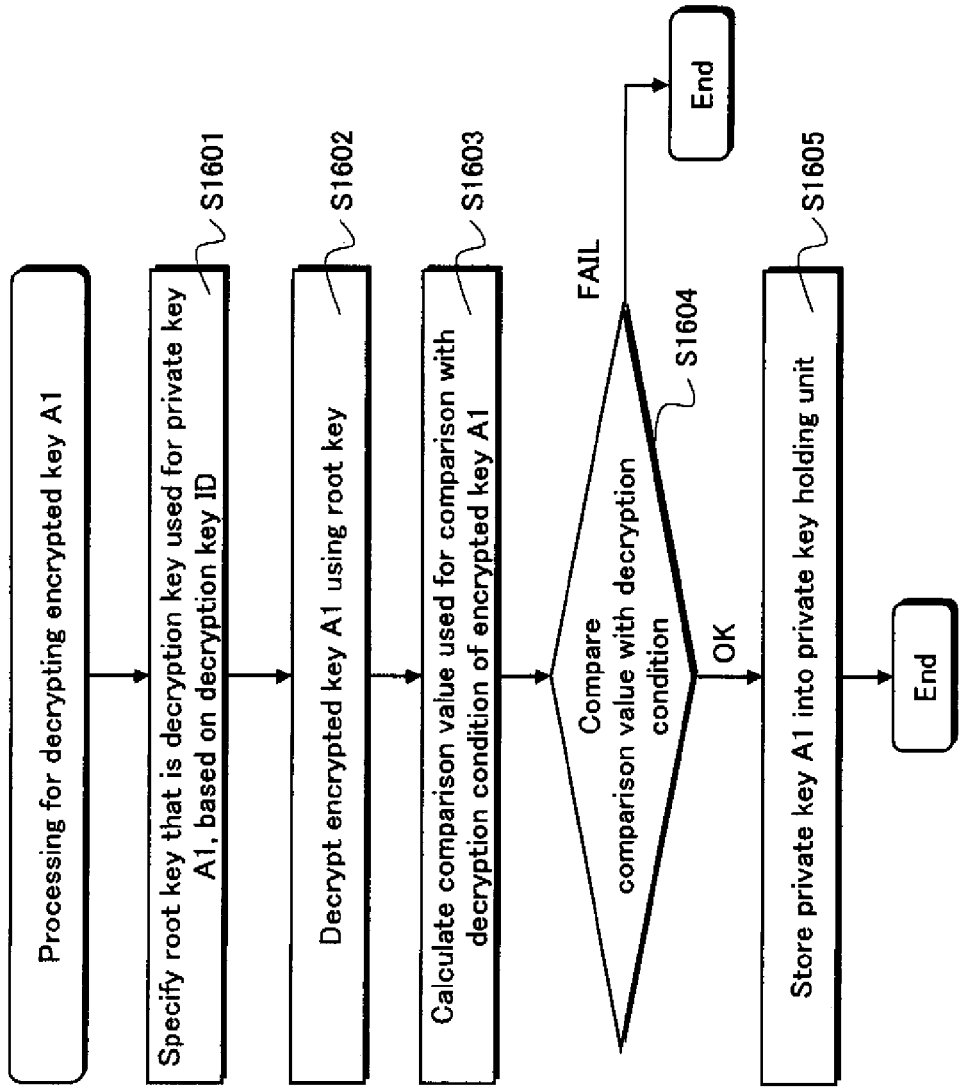
FIG. 16 is a flow diagram of decryption processing of the private key A1 according to Embodiment 2 of the present invention.
Figure 17:
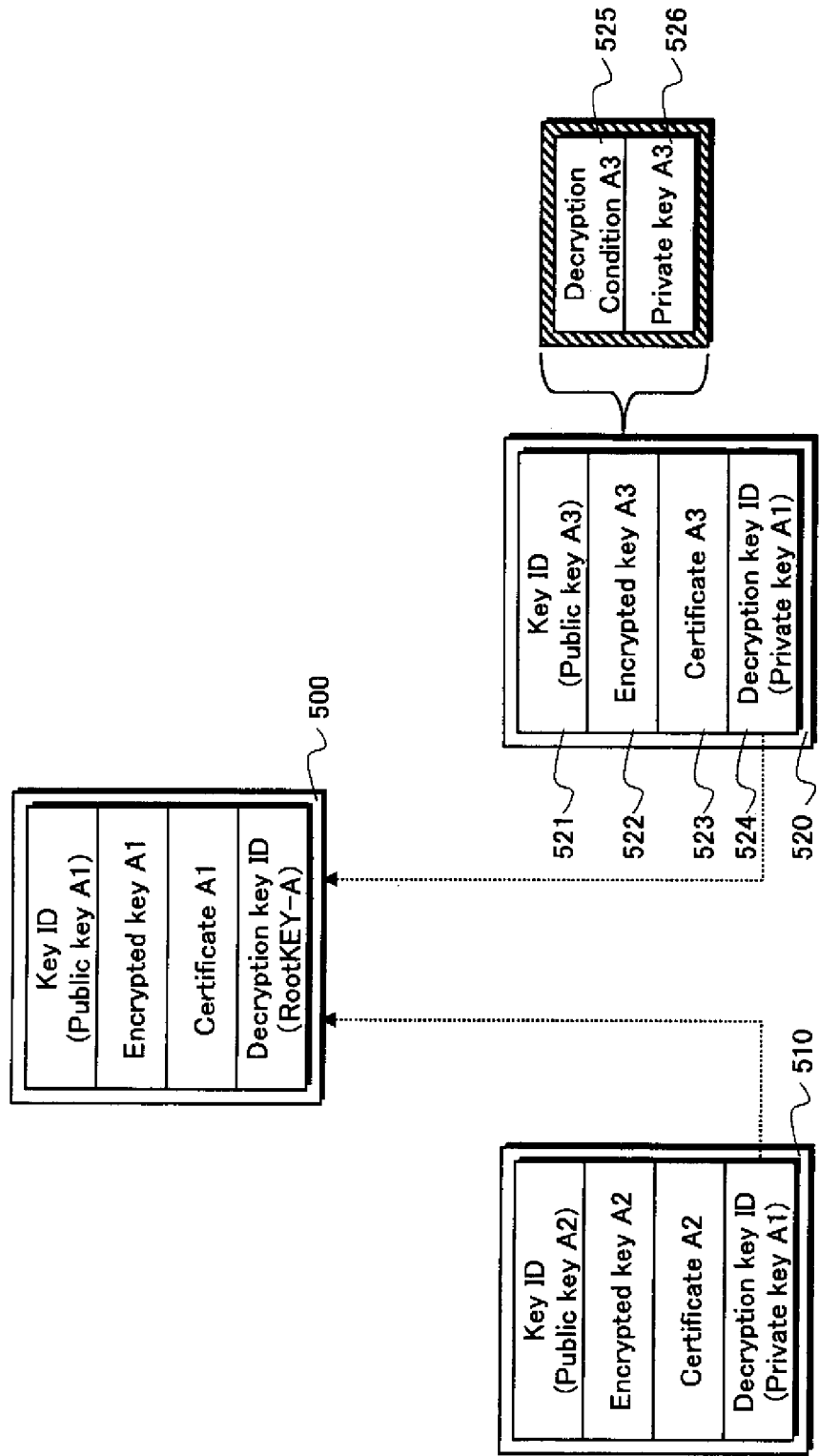
FIG. 17 is a schematic diagram showing processing for saving an encrypted key A3 into the key information holding unit of the terminal device A according to Embodiment 2 of the present invention.

FIG. 16 is a flow diagram showing in detail the processing for decrypting the encrypted key A1 (502).

First, the authentication processing unit 206 specifies that the root key 213 is a decryption key, based on the decryption key ID 504 of the encrypted key A1 (502) in the key information held in the key information holding unit 205 (S1601). Then, based on a request from the authentication processing unit 206, the decryption unit 701 of the security module 204 decrypts the encrypted key A1 using the root key 213 (S1602). Furthermore, the decryption unit 701 calculates a comparison value used for comparison with the decryption condition A1 (505), with reference to a register of the state information holding unit 210 (S1603), and compares the comparison value with the decryption condition A1 (505) (S1604). At this time, if the comparison value does not match the decryption condition A1 (505), the security module 204 deletes the data decrypted in step S1602, and transmits a result of the comparison as a failure in the decryption processing to the authentication processing unit 206. Also, if the comparison value matches the decryption condition A1 (505), the security module 204 stores, in the private key holding unit 211, the private key A1 decrypted in step S1602, and transmits a result of the comparison as a success in the decryption processing to the authentication processing unit 206 (S1605).

3. Embodiment 3

The following describes Embodiment 3 of the present invention.

In Embodiment 3 of the present invention, the terminal devices A100 and B101 are configured to have a function of connecting to a terminal device under the condition that a specific application that has been started is valid, and a function of performing mutual authentication with the terminal device.

A system structure of Embodiment 3 is the same as that of Embodiment 1.

Figure 20:
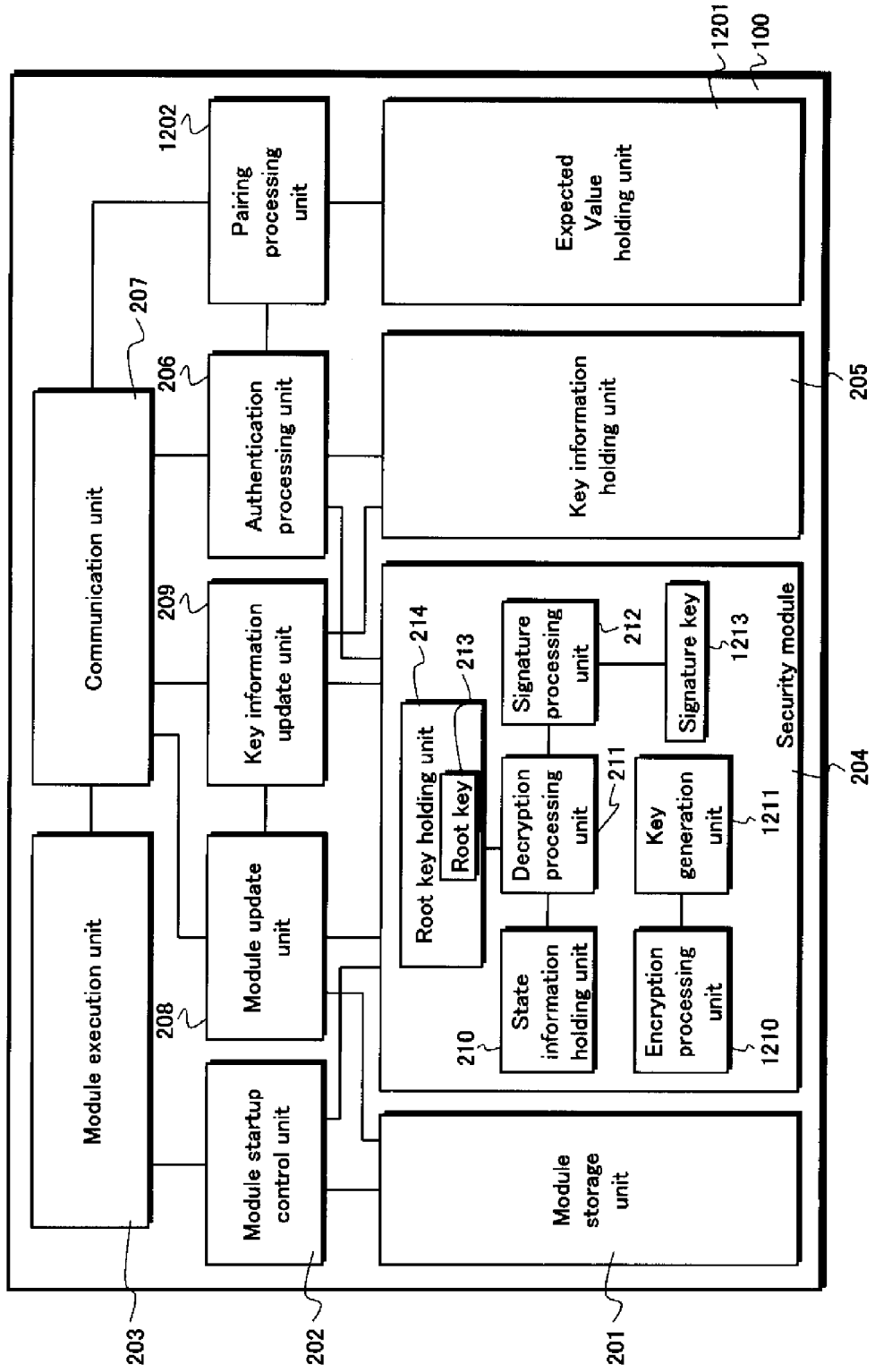
FIG. 20 is a block diagram showing a structure of each of the terminal devices A and B according to Embodiment 3 of the present invention.

FIG. 20 shows a structure of the terminal devices A100 and B101 according to Embodiment 3 of the present invention. Each of the terminal devices A100 and B101 has a function of performing authentication processing, which is one of the functions of the terminal device A100 according to Embodiment 1, and a function of performing pairing processing, which is one of the functions of the terminal device C102 according to Embodiment 2. Hereinafter, repetitive descriptions on the same components are omitted.

The authentication processing unit 206 holds a public key (not shown) of the manufacturer of the terminal device A100 and a public key (not shown) of the manufacturer of the terminal device B101. The public key of the manufacturer of the terminal device A100 is used to verify the validity of the certificates A1 (503) and A2 (513). The public key of the manufacturer of the terminal device B101 is used to verify the validity of certificates B1 (2103) and B2 (2113). Each of the public key of the manufacturer of the terminal device A100 and the public key of the manufacturer of the terminal device B101 is a 2048-bit public key in the RSA encryption method.

Figure 21:
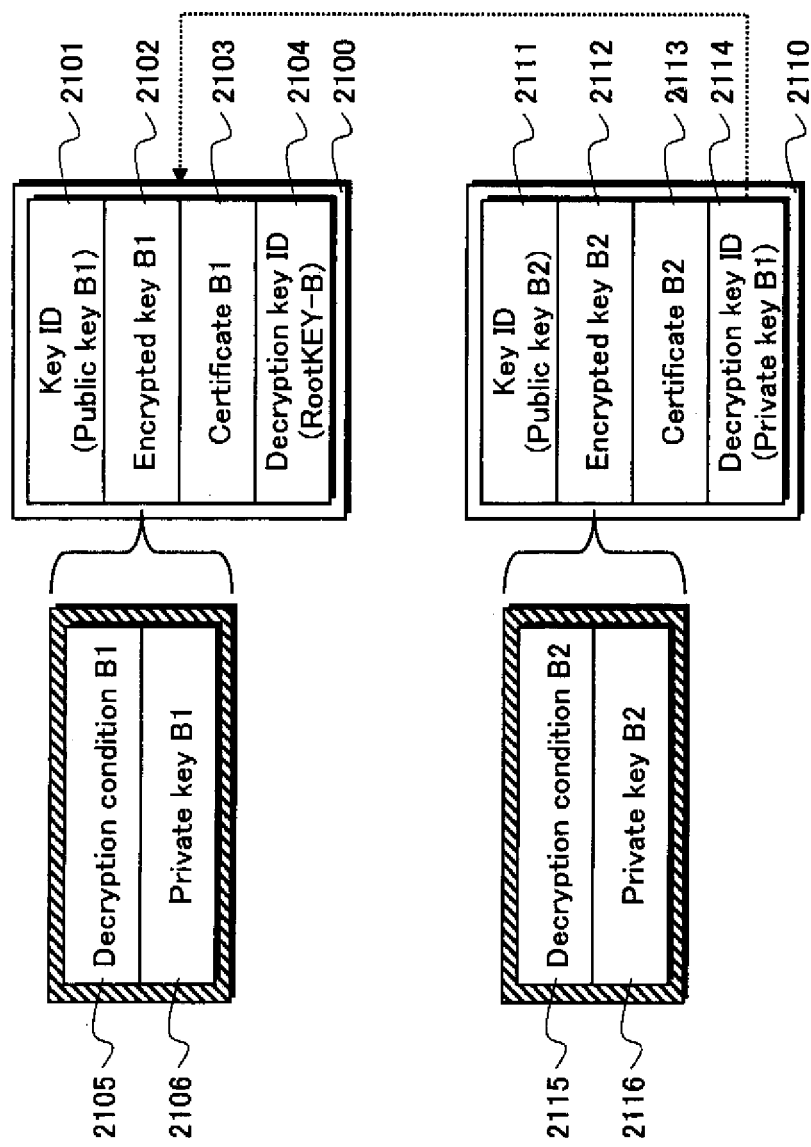
FIG. 21 shows key information held in a key information holding unit of the terminal device B according to Embodiment 3 of the present invention.

FIG. 21 shows key information held in the key information holding unit 205 of the terminal device B101. FIG. 21 shows a case where two pieces of key information, namely key information 2100 and key information 2110, are held in the key information holding unit 205 of the terminal device B101. The key information 2100 includes a key ID (2101), an encrypted key B1 (2102), a certificate B1 (2103), and a decryption key ID (2104). The key ID (2101) indicates a public key B1. The certificate B1 (2103) is a certificate of the public key B1. The decryption key ID (2104) is an ID that indicates a root key B (RootKEY-B), which is a decryption key of the encrypted key B1. The encrypted key B1 (2102) is a key obtained by encrypting a decryption condition B1 (2105) and a private key B1 (2106), in a manner that the decryption condition B1 (2105) and the private key B1 (2106) are decryptable by the root key B. Here, the decryption condition B1 (2105) indicates a condition for decrypting the encrypted key B1 (2102).

The decryption condition B1 (2105) shows an expected value that is supposed to be held in the register of the state information holding unit 210 upon completion of secure boot of the system modules 1, 2, and 3 by the module boot control unit 202. The private key B1 that has been encrypted is decryptable only when the secure boot is completed. The key information 2110 includes a key ID (2111), an encrypted key B2 (2121), a certificate B2 (2113), and a decryption key ID (2114). The key ID (2111) indicates a public key B2. The certificate B2 (2113) is a certificate of the public key B2. The decryption key ID (2114) is an ID that indicates the private key B1, which is a decryption key of the encrypted key B2. The encrypted key B2 (2112) is a key obtained by encrypting a decryption condition B2 (2115) and a private key B2 (2116), in a manner that the decryption condition B2 (2115) and the private key B2 (2116) are decryptable by the public key B1. Here, the decryption condition B2 (2115) indicates a condition for decrypting the encrypted key B2 (2112).

The decryption condition B2 (2115) shows an expected value that is supposed to be held in the register of the state information holding unit 210 when the application module X has been started successfully by the module boot control unit 202. The private key B2 that has been encrypted is decryptable using the private key B1 only when the application module X has been started. In other words, the private key B2 is decryptable only when the secure boot is completed and the application module X has been started. Note that each of the private keys B1 and B2 is a 2048-bit private key in the RSA encryption method. The key information 2100 and the key information 2110 are set by the manufacturer of the terminal device B101.

Figure 22:
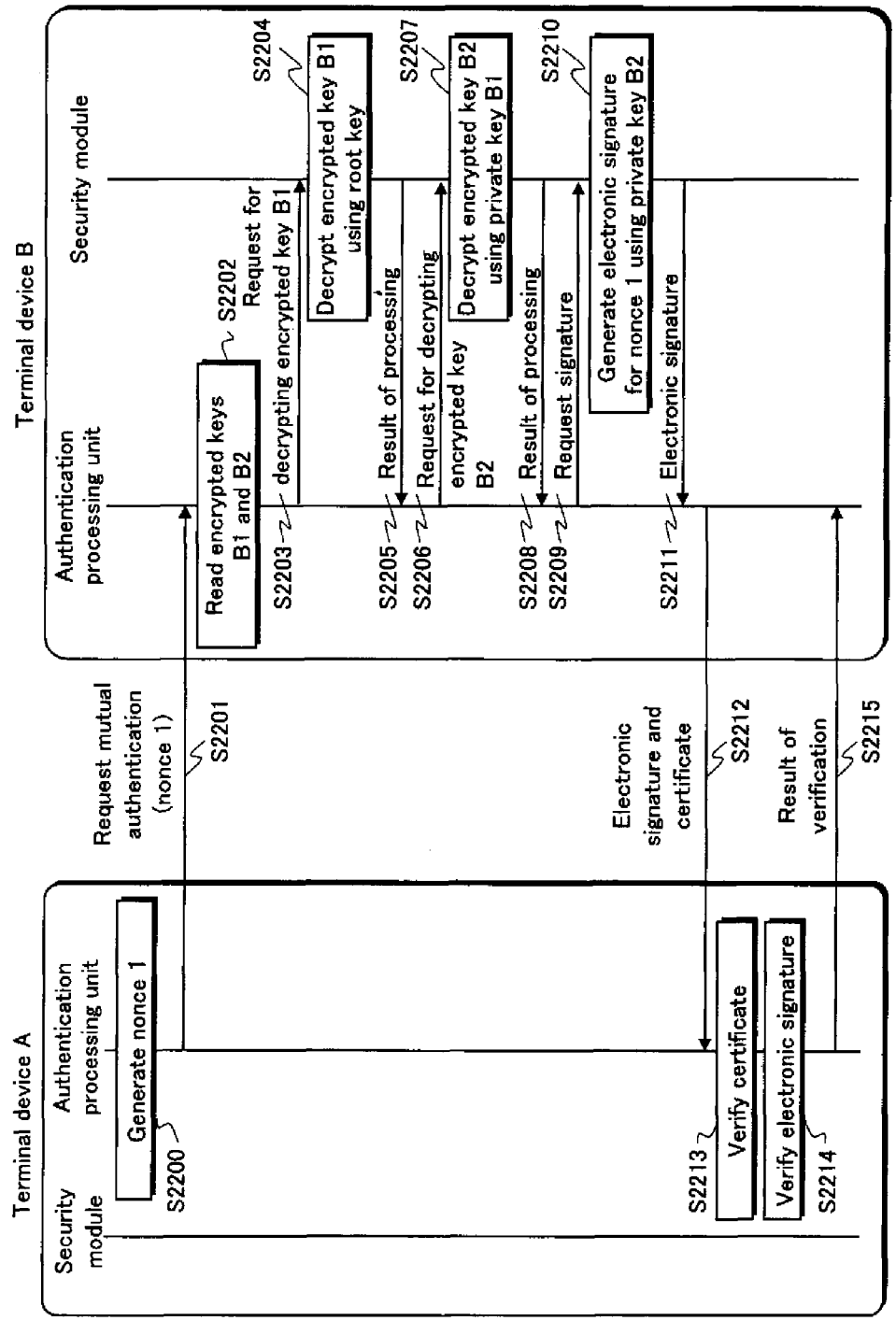
FIG. 22 is a sequence diagram showing the first half of mutual authentication processing between the terminal devices A and B according to Embodiment 3 of the present invention.
Figure 23:
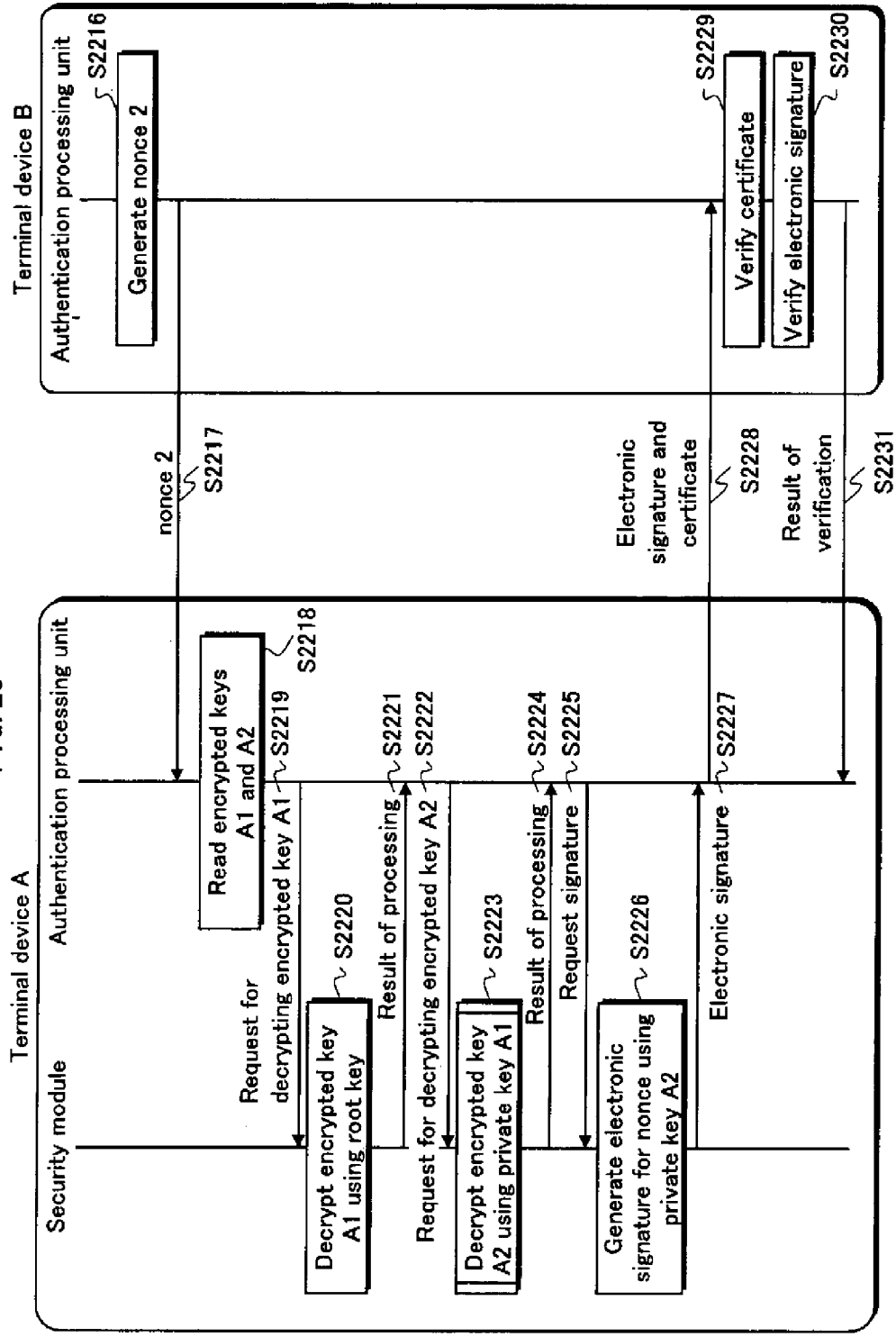
FIG. 23 is a sequence diagram showing the latter half of the mutual authentication processing between the terminal devices A and B according to Embodiment 3 of the present invention.

The following describes a sequence of mutual authentication processing performed between the terminal devices A100 and B101, in both of which the application module X has been started. The description is provided with reference to FIGS. 22 and 23. First, the authentication processing unit 206 of the terminal device A100 generates a nonce 1, which is a random character string (S2200), and transmits a message including the nonce 1, which is a message for requesting mutual authentication processing, to the terminal device B101 (S2201). Upon receiving the message for requesting the mutual authentication processing, the authentication processing unit 206 of the terminal device B101 reads the encrypted keys B1 (2102) and B2 (2112) from the key information holding unit 205 of the terminal device B101 (S2202). Then, the authentication processing unit 206 requests the security module 204 to decrypt the encrypted key B1 (2102) (S2203). The security module 204 of the terminal device B101 performs processing for decrypting the encrypted key B1 using the root key (S2204), and transmits a result of the decryption processing to the authentication processing unit 206 of the terminal device B101 (S2205). At this time, the security module 204 of the terminal device B101 compares a value held in a register of the state information holding unit 210 with the decryption condition B1 (2105). When the decryption of the encrypted key B1 (2102) is successful and the comparison is successful, that is, when the value matches the decryption condition B1 (2105), the security module 204 transmits a result of processing informing that the decryption processing is successful to the authentication processing unit 206. When the decryption of the encrypted key B1 (2102) is not successful, and the comparison is not successful, that is, when the value in the register of the state information holding unit 210 does not match the decryption condition B1 (2105), the security module 204 transmits a result of processing indicating that the decryption processing is not successful to the authentication processing unit 206. When a result of the processing in step S2205 indicates that the comparison is not successful, the authentication processing unit 206 of the terminal device B101 aborts the authentication processing. When a result of the processing in step S2205 is successful, the authentication processing unit 206 of the terminal device B101 requests the security module 204 of the terminal device B101 to decrypt the encrypted key B2 (2112) (S2206).

The security module 204 of the terminal device B101 performs processing for decrypting the encrypted key B2 using the private key B1 that is obtained in the decryption processing of step S2204 (S2207), and transmits a result of the decryption processing to the authentication processing unit 206 of the terminal device B101 (S2208). At this time, the security module 204 of the terminal device B101 compares a value held in a register of the state information holding unit 210 with the decryption condition B2 (2115). When the decryption of the encrypted key B2 (2112) is successful and the comparison is successful, that is, when the value matches the decryption condition B2 (2115), the security module 204 transmits a result of processing informing that the decryption processing is successful to the authentication processing unit 206. When the decryption of the encrypted key B2 (2112) is not successful, and the comparison is not successful, that is, when the value in the register of the state information holding unit 210 does not match the decryption condition B2 (2115), the security module 204 transmits a result of processing indicating that the decryption processing is not successful to the authentication processing unit 206. When a result of the processing in step S2208 indicates that the comparison is not successful, the authentication processing unit 206 of the terminal device B101 aborts the authentication processing. When a result of the processing in step S2208 is successful, the authentication processing unit 206 of the terminal device B101 requests the security module 204 of the terminal device B101 to perform processing for generating an electronic signature for the nonce 1 using the private key B2 (S2209).

The security module 204 of the terminal device B101 performs processing for generating the electronic signature for the nonce 1 using the private key B2 decrypted in step S2207 (S2210), and transmits the electronic signature to the authentication processing unit 206 of the terminal device B101 (S2211). Specifically, the signature processing is processing for generating a hash value of the nonce 1, and encrypting the hash value using the private key B2. Upon receiving the electronic signature, the authentication processing unit 206 of the terminal device B 101 transmits the electronic signature and the certificate B2 to the terminal device A100 (S2212). The authentication processing unit 206 of the terminal device A100 verifies the certificate B2 of the public key B2, which is received from the terminal device B101 (S2213). Furthermore, the authentication processing unit 206 verifies whether the electronic signature has been generated for the nonce 1 using the private key B2, using the public key B2 included in the certificate B2 that has been verified (S2214). Then, the authentication processing unit 206 transmits a result of the verification to the terminal device B101 (S2215). Specifically, in the verification of the electronic signature in step S2214, the authentication processing unit 206 of the terminal device A100 generates the hash value of the nonce 1 that is transmitted to the terminal device B101 in step S2201. Then, the authentication processing unit 206 decrypts the electronic signature received from the terminal device B101, using the public key B2 (1816), and compares the decrypted electronic signature with the hash value of the nonce 1. Note here that in step S2210, the signature is generated from the hash value of the nonce 1. However, it is possible to directly encrypt the nonce 1 using the private key B2, without generating the hash value thereof. In this case, the following processing may be performed in step S2214. That is, the terminal device A100 may decrypt the encrypted nonce 1 using the public key B2 (1816), and compare the value of the decrypted nonce 1 with the value of the nonce 1 transmitted to the terminal device B101 in step S2201 to verify whether the values match each other.

Subsequently, the authentication processing unit 206 of the terminal device B101 generates a nonce 2, which is a random character string different from the nonce 1 (S2216), and transmits the nonce 2 to the terminal device A100 (S2217). Upon receiving the nonce 2, the authentication processing unit 206 of the terminal device A100 reads the encrypted keys A1 and A2 from the key information holding unit 205 (S2218). Then, the authentication processing unit 206 requests the security module 204 of the terminal device A100 to decrypt the encrypted key A1 (S2219). The security module 204 of the terminal device A100 performs processing for decrypting the encrypted key A1 using the root key (S2220), and transmits a result of the decryption processing to the authentication processing unit 206 of the terminal device A100 (S2221). At this time, the security module 204 of the terminal device A100 compares a value held in a register of the state information holding unit 210 with the decryption condition A1 (505). When the decryption of the encrypted key A1 is successful and the comparison is successful, that is, when the value matches the decryption condition A1 (505), the security module 204 transmits a result of processing informing that the decryption processing is successful to the authentication processing unit 206. When the decryption of the encrypted key A1 (502) is not successful, and the comparison is not successful, that is, when the value in the register of the state information holding unit 210 does not match the decryption condition A1 (505), the security module 204 transmits a result of processing indicating that the decryption processing is not successful to the authentication processing unit 206. When a result of the processing in step S2221 indicates that the comparison is not successful, the authentication processing unit 206 of the terminal device A100 aborts the authentication processing. When a result of the processing in step S2221 is successful, the authentication processing unit 206 of the terminal device A100 requests the security module 204 of the terminal device A100 to decrypt the encrypted key A2 (S2222).

The security module 204 of the terminal device A100 acquires the private key A2 by decrypting the encrypted key A2 (512) using the private key A1 decrypted in step S2220, and transmits a result of the decryption processing to the authentication processing unit 206 of the terminal device A100 (S2224). At this time, the security module 204 of the terminal device A100 compares a value held in a register of the state information holding unit 210 with the decryption condition A2 (515). When the decryption of the encrypted key A2 (512) is successful and the comparison is successful, that is, when the value matches the decryption condition A2 (515), the security module 204 transmits a result of processing informing that the decryption processing is successful to the authentication processing unit 206. When the decryption of the encrypted key A2 (512) is not successful, and the comparison is not successful, that is, when the value in the register of the state information holding unit 210 does not match the decryption condition A2 (515), the security module 204 transmits a result of processing indicating that the decryption processing is not successful to the authentication processing unit 206. When a result of the processing in step S2224 indicates that the decryption processing is not successful, the authentication processing unit 206 of the terminal device A100 aborts the authentication processing. When a result of the processing in step S2224 is successful, the authentication processing unit 206 of the terminal device A100 requests the security module 204 of the terminal device A100 to perform processing for generating an electronic signature for the nonce 2 using the private key A2 (S2225). The security module 204 of the terminal device A100 performs processing for generating the electronic signature for the nonce 2 using the private key A2 decrypted in step S2223 (S2226), and transmits the electronic signature to the authentication processing unit 206 of the terminal device A100 (S2227). Upon receiving the electronic signature, the authentication processing unit 206 of the terminal device A100 transmits the electronic signature and the certificate A2 to the terminal device B101 (S2228). Specifically, the signature processing is processing for generating a hash value of the nonce 2, and encrypting the hash value using the private key A2.

Upon receiving the certificate A2 and the electronic signature, the authentication processing unit 206 of the terminal device B101 verifies the certificate A2 (S2229), and verifies whether the electronic signature is a signature for the nonce 2 generated using the private key A2, using the public key A2 included in the certificate A2 that has been verified (S2230). Subsequently, the authentication unit 206 of the terminal device B101 transmits a result of the verification to the terminal device A100 (S2231) and ends the authentication processing. Specifically, in the verification of the electronic signature in step S2230, the authentication processing unit 206 of the terminal device B101 generates the hash value of the nonce 2 that is transmitted to the terminal device A100 in step S2217. Then, the authentication processing unit 206 decrypts the electronic signature received from the terminal device A100, using the public key A2 (616), and compares the decrypted electronic signature with the hash value of the nonce 2. Note that in step S2226, the signature is generated from the hash value of the nonce 2. However, it is possible to directly encrypt the nonce 2 using the private key A2, without generating the hash value thereof. In this case, the following processing may be performed in step S2230. That is, the terminal device B101 may decrypt the encrypted nonce 2 using the public key A2, and compare the value of the decrypted nonce 2 with the value of the nonce 2 transmitted to the terminal device A100 in step S2217 to verify whether the values match each other.

The terminal device A100 can verify whether the secure boot has been completed in the terminal device B101 and the application module X that has been started therein is valid, by verifying the validity of the electronic signature generated for the nonce 1 using the private key B2. Meanwhile, the terminal device B101 can verify whether the secure boot has been completed in the terminal device A100 and the application module X that has been started therein is valid, by verifying the validity of the electronic signature generated for the nonce 2 using the private key A2.

4. Modifications and Others

Although the present invention has been described based on the embodiments described above, the contents of the present invention are of course not limited to the specific examples shown in the above-mentioned embodiment. For example the following modifications are possible.

(1) In Embodiment 1 described above, the private key 1 (2401), the private key 2 (2402), the root key 213, the private key A1, the private key A2, and the private key of the manufacturer of the terminal device A100 are keys in the RSA encryption method. However, it is possible to use keys in another encryption method such as ECC (ELLIPTIC CURVE CRYPTOSYSTEM) or NTRU, instead of the keys in the RSA encryption method. Also, the length of each key is not limited to 2048 bits, and may be longer or shorter than 2048 bits.

Also, in the above embodiments, SHA1 is used as the algorithm of a hash operation. However, it is possible to use another algorithm such as SHA256 or SHA512.

(2) In Embodiment 1 described above, the root key 213, the private key A1, and the private key A2 are keys in the public key encryption method. However, it is possible to use keys in a common key encryption method, such as AES (ADVANCED ENCRYPTION STANDARD), DES (DATA ENCRYPTION STANDARD), or 3DES.

In this case, the terminal devices A100 and B101 share a common root key, a common key A1, and a common key A2. Processing performed using the root key 213 is performed using the common root key instead. Processing performed using the private key A1 (506) and the public key A1 (606) is performed using the common key A1 instead. Processing performed using the private key A2 (516) and the public key A2 (616) is performed using the common key A2 instead. Note that the certificate A2 (513) in this case does not include either the public key A2 (616) or the common key A2.

(3) In Embodiment 1 described above, the decryption condition A2 (515) shows an expected value that is supposed to be held in the register of the state information holding unit 210 when the application module X that is started is valid. Specifically, the decryption condition A2 (515) shows the cumulative value obtained by adding the hash value of the application module X that is valid to a value held in the register of the state information holding unit 210. However, it is not limited to such. The decryption condition A2 (515) may show an expected value that is supposed to be held in the register of the state information holding unit 210 when another hash value, namely the hash value of a specific passcode, is also added on top of the cumulative value held in the register of the state information holding unit 210.

The specific passcode may be a user password input by the user of the terminal device A100 or a license code issued by the provider of the application module X. In this case, the application module X that has been started by the module startup control unit 202 adds the hash value of the passcode to a value held in any of the registers 8 to 15, which are used for the application, in the state information holding unit 210. This makes it possible to set more restrictive conditions for decrypting the encrypted key A2 (512). Specifically, the decryption condition may include the condition that "a correct password has been input", in addition to two conditions, i.e., the condition that "the terminal device A100 has completed secure boot" and the condition that "the application module X that has been started in the terminal device A100 is valid".

(4) In Embodiment 2 described above, an expected value is searched for from the expected value holding unit 1201, using the application name and the model name as search keys. However, an application ID may be used instead of the application name, and a model ID may be used instead of the model name. In this case, a message that is for requesting pairing with the application module Y, and that is transmitted to the terminal device C102 in step S1401 includes the application ID, and the certificate A1 (503) includes the model ID.

(5) In Embodiment 2 described above, the pairing processing unit 1202 searches the expected value holding unit 1201 for the expected value of when the terminal device A100 executes the application module Y. However, the expected value may be received from the terminal device A100. In this case, the terminal device C102 receives, from the terminal device A100, a module certificate Y425 that is a certificate of the application module Y. Then, the terminal device C102 treats a module measurement value included in the module certificate Y425 as the expected value. Also in this case, the authentication processing unit 306 of the terminal device C102 holds a public key (not shown) of the provider of the application module Y. The public key is used to verify the validity of the module certificate Y425. The public key of the provider of the application module Y is a public key in the RSA encryption method, and corresponds to a private key of the provider thereof that is used for generation of a signature provided for the module certificate Y425.

Figure 28:
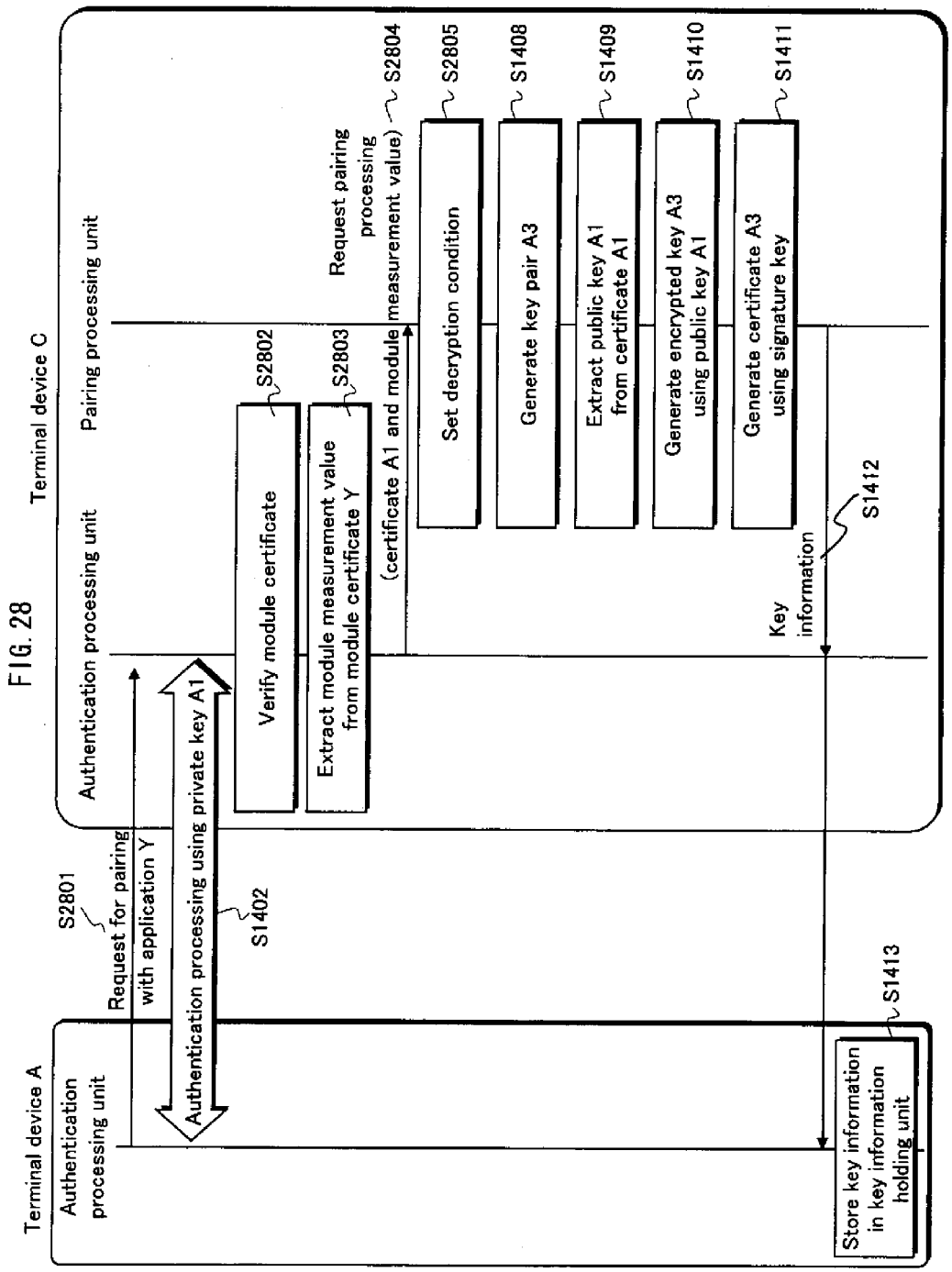
FIG. 28 is a sequence diagram of processing for pairing the terminal device A with the terminal device C, in the case of receiving an expected value from the terminal device A according to Embodiment 2 of the present invention.
Figure 29:
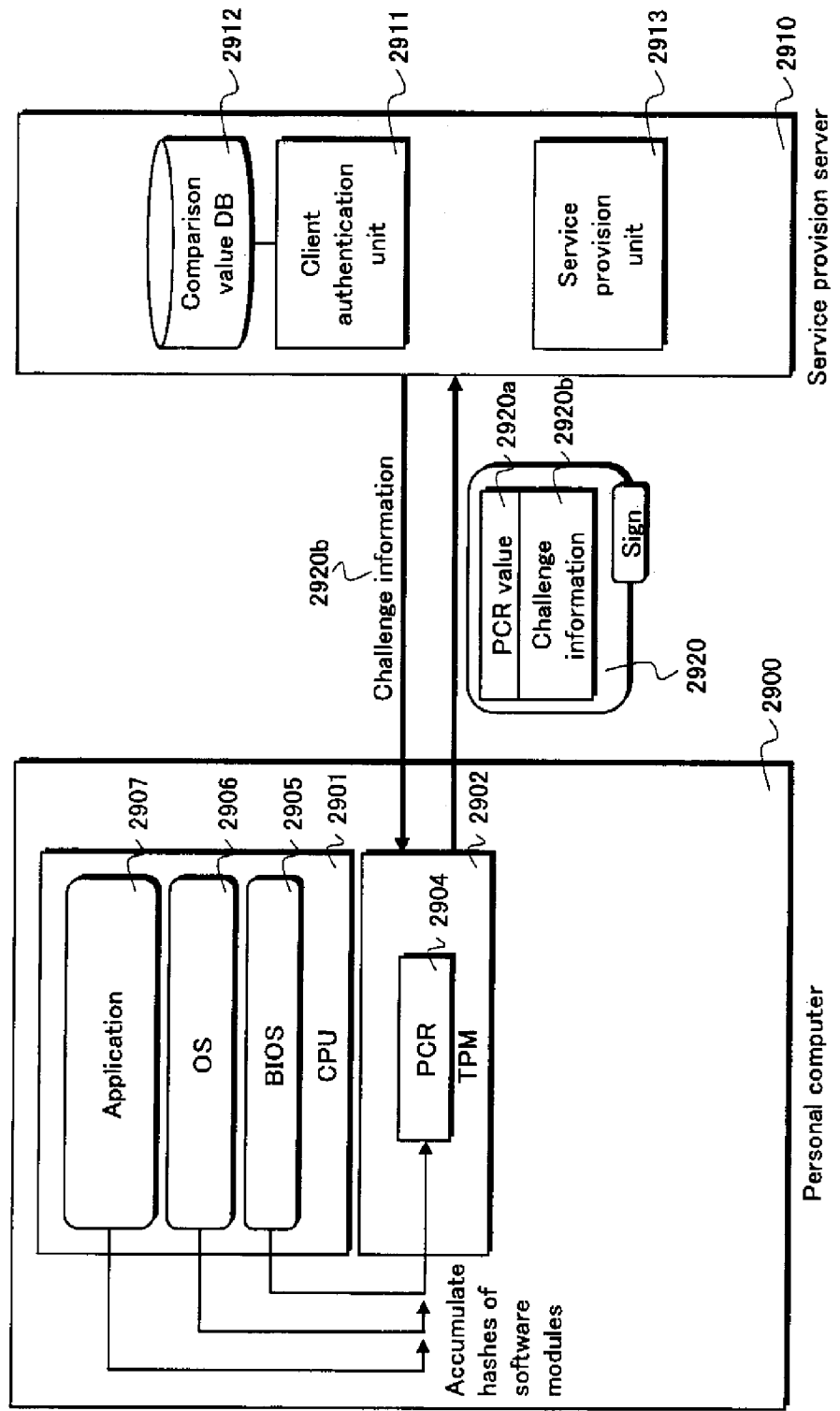
FIG. 29 shows one example of authentication processing based on a conventional technique.

FIG. 28 shows a sequence of pairing processing between the terminal devices A100 and C102, in the case of receiving the expected value from the terminal device A100. The pairing processing is performed so that authentication is performed under the condition that the application module Y has been started in the terminal device A100.

First, the authentication processing unit 206 of the terminal device A100 transmits, to the terminal device C102, a message for requesting pairing with the application module Y (S2801). At this time, the message includes the module certificate Y425, which is the certificate of the application module Y. After the message is transmitted, authentication processing using the private key A1 (505) is performed between the terminal devices A100 and C102, as shown in FIG. 14 (S1402).

When the authentication processing fails, the pairing processing is aborted. When the authentication processing is successful, the authentication processing unit 1206 of the terminal device C102 verifies the module certificate Y425 using the public key of the provider of the application module Y (S2802). Furthermore, the authentication processing unit 1206 extracts the module measurement value 402 from the module certificate Y425 that has been verified (S2803), and transmits a request for pairing processing to the pairing processing unit 1202 (S2804). The request for pairing processing includes the name of the application module Y, the certificate A1 (503) of the public key A1, which is acquired in the authentication processing in step S1402, and the module measurement value extracted in step 2803.

Upon receiving the request for pairing processing, the pairing processing unit 1202 sets the received module measurement value as the decryption condition A3 (525) (S2805). Then, the pairing processing unit 1202 generates a key pair consisting of the private key A3 (526) and the public key A3 (1806) corresponding to the private key A3 (526) (S1408). The private key A3 (526) is a key for an algorithm in the public key encryption method, which is included in the information on encryption algorithms supported by the terminal device A100 in the terminal information 608 of the certificate A1 (503). Subsequently, the pairing processing unit 1202 extracts the public key A1 (606) from the certificate A1 (503) that has been received (S1409), and generates the encrypted key A3 (522) by encrypting the private key A3 (526) together with the decryption condition A3 (525), using the public key A1 (606) (S1410). Then, the pairing processing unit 1202 generates the certificate A3 (523), which is a certificate of the public key A3 corresponding to the private key A3, using the signature key 1213 (S1411) (see FIG. 18). At this time, the pairing processing unit 1202 sets a value indicating the terminal device A100 to the subject of the certificate A3 (523), which is the same value set to the subject of the certificate A1 (503) that has been received.

The pairing processing unit 1202 transmits the key information 520 to the terminal device A100 (S1412). Here, the key information 520 includes the encrypted key A3 (522) and the certificate A3 (523) that have been generated, the key ID "KEY-A3" (521) of the encrypted key A3 (522), and the decryption key ID "KEY-A1" (524). Upon receiving the key information 520, the authentication processing unit 206 of the terminal device A100 stores the key information 520 into the key information holding unit 205 (S1413), and ends the pairing processing.

(6) In Embodiment 2 described above, the terminal device C102 has the function of generating the encrypted key and the certificate for the pairing processing. However, it is not limited to such. Instead of the terminal device C102, a server device that is communicable via a network may have the same aforementioned function. In this case, the terminal device A100 may perform processing that corresponds to steps S1401 to S1413 in FIG. 14, either directly with the server device or with the server device via the terminal device C102. This realizes the pairing processing for pairing the terminal device A100 with the terminal device C102.

(7) In Embodiment 2 described above, the private key 1 (2401), the private key 3 (2403), the root key 213, the private key A1, the private key A2, the private key A3, and the private key of the manufacturer of the terminal device A100 are keys in the public key encryption method. However, it is possible to use keys in another encryption method such as ECC or NTRU. Also, the length of each key is not limited to 2048 bits, and may be longer or shorter than 2048 bits.

(8) In Embodiment 2 described above, the root key 213, the private key A1, the private key A2, and the private key A3 are keys in the public key encryption method. However, it is possible to use keys in a common key encryption method, such as AES, DES, or 3DES. In this case, the terminal devices A100 and C102 share a common root key, the common key A1, and the common key A3. Processing performed using the root key 213 is performed using the common root key instead. Processing performed using the private key A1 (506) and the public key A1 (606) is performed using the common key A1 instead. Processing performed using the private key A3 (526) and the public key A3 (626) is performed using the common key A3 instead. Note here that the certificate A1 (503) in this case does not include either the public key A1 (606) or the common key A1. Also, the certificate A3 (523) in this case does not include either the public key A3 (1806) or the common key A3.

(9) In Embodiment 2 described above, the decryption condition A3 (525) shows an expected value that is supposed to be held in the register of the state information holding unit 210 when the application module Y that is started is valid. Specifically, the decryption condition A3 (525) shows the cumulative value obtained by adding the hash value of the application module Y that is valid to a value held in the register of the state information holding unit 210. However, it is not limited to such. The decryption condition A3 (525) may show an expected value that is supposed to be held in the register of the state information holding unit 210 when another hash value, namely the hash value of a specific passcode, is also added on top of the cumulative value held in the register of the state information holding unit 210.

The specific passcode may be a user password input by the user of the terminal device A100 or a license code issued by the provider of the application module Y. In this case, the application module Y that has been started by the module startup control unit 202 adds the hash value of the passcode to a value held in any of the registers 8 to 15, which are used for the application, in the state information holding unit 210. This makes it possible to set more restrictive conditions for decrypting the encrypted key A3 (522). Specifically, the decryption condition may include the condition that "a correct password has been input", in addition to two conditions, i.e., the condition that "the terminal device A100 has completed secure boot" and the condition that "the application module Y that has been started in the terminal device A100 is valid".

(10) In Embodiment 2 described above, the private key A3 (526) is encrypted using the public key A1 (606). However, the private key A3 (526) may be encrypted using the public key A2 (616). In this case, the terminal device A100 and the terminal device C102 may perform the authentication processing using the private key A2 (516), which is described in Embodiment 1 with reference to FIG. 8. The terminal device C102 may acquire the public key A2 (616) from the certificate A2 (513) received in the authentication processing, and generate the encrypted key A3 (522) by encrypting the private key A3 (526) using the public key A2 (616). This makes it possible to set more restrictive conditions for decrypting the encrypted key A3 (522). Specifically, the decryption condition may include the condition that "the application module Y that has been started in the terminal device A100 is valid", in addition to two conditions, i.e., the condition that "the terminal device A100 has completed secure boot" and the condition that "the application module X that has been started in the terminal device A100 is valid".

(11) In Embodiment 2 described above, the expected value holding unit 1201 holds in advance the expected value of the application module. This eliminates the need of processing for receiving the expected value in Embodiment 2. However, it is not limited to such. The expected value of the application module may be acquired from a terminal device on the other end of communications. In this case, it is preferable that the terminal device on the other end either provides a signature for the expected value or encrypts the expected value before transmission of the expected value, so as to prevent the expected value from being tampered with. With this structure, even if the configuration of the terminal device on the other end is unknown, it is possible to generate an encrypted key that is bound to the configuration of the terminal device.

(12) In Embodiment 3 described above, the root key 213, the private key A1, the private key A2, the private key B1, the private key B2, the private key of the manufacturer of the terminal device A, and the private key of the manufacturer of the terminal device B101 are keys in the public key encryption method. However, it is not limited to such. It is possible to use keys in another encryption method such as ECC or NTRU. Also, the length of each key is not limited to 2048 bits, and may be longer or shorter than 2048 bits.

(13) In Embodiment 3 described above, the root key 213, the private key A1, the private key A2, the private key B1, and the private key B2 are keys in the public key encryption method. However, it is possible to use keys in a common key encryption method, such as AES, DES, or 3DES.

In this case, the terminal devices A100 and B101 share a common root key, the common key A1, the common key A2, the common key B1, and the common key B2. Processing performed using the root key 213 is performed using the common root key instead. Processing performed using the private key A1 (506) and the public key A1 (606) is performed using the common key A1 instead. Processing performed using the private key A2 (516) and the public key A2 (616) is performed using the common key A2 instead. Also, processing performed using the private key B1 (2106) and the public key B1 (2106) is performed using the common key B1 instead. Processing performed using the private key B2 (2116) and the public key B2 (2116) is performed using the common key B2 instead. Note here that the certificate A2 (513) in this case does not include either the public key A2 (616) or the common key A2. Also, the certificate B2 (2113) in this case does not include either the public key B2 or the common key B2.

(14) In the above embodiments, the private key used for authentication processing is encrypted in a manner that the private key is decrypted when the following two conditions are satisfied: the system modules that have been started are valid; and the application module that has been started is valid. However, it is not limited to such. It is possible to disregard the condition that the application module that has been started is valid. In this case, when the authentication processing is completed successfully, it means that the system modules that have been started are valid. Also, even if any of the system modules is updated, the private key used for the authentication processing does not need to be updated. Instead, only a key used for decrypting the private key may be re-encrypted and updated. The re-encryption is performed by binding the key to a new structure.

(15) In the above embodiments, the authentication processing is performed by generating a signature for a nonce and verifying the signature. However, it is not limited to such. It is possible to apply an authentication method selected from various other authentication methods. For example, the authentication processing may be performed by encrypting a nonce, and checking whether the encrypted nonce can be decrypted correctly.

(16) In the above embodiments, the certificates used in the communications between the terminal devices include the usage conditions. However, it is possible to use certificates that do not include any usage conditions. In the case of using both of the certificates that do not include any usage conditions and the certificates that include the usage conditions, judgment is performed as to whether there are any usage conditions. In the case of using only the certificates that do not include any usage conditions, general processing is performed without performing the judgment. The use of the certificates that do not include any usage conditions enables communications with a terminal device that does not support the technique of the present invention.

Also, a terminal device that receives the certificates including usage conditions may hold a database for the usage conditions. In this way, upon receiving any of the certificates that include the usage conditions, the terminal device can perform processing that satisfies the usage condition included in the certificate. This database includes application information and information on the models of terminal devices that are permitted or not permitted to be connected. With this structure, upon receiving a certificate, the terminal device can compare the usage condition in the certificate with a corresponding usage condition in the database, and judge whether a terminal device certified by the certificate is permitted to be connected.

Also, the aforementioned database may be realized by a database that is updatable. This makes it possible to realize more flexible topologies. For example, a terminal device permitted to be connected so far may be revoked by being registered as a terminal device not permitted to be connected. Alternatively, the terminal device permitted to be connected so far may be registered as a terminal device only permitted to be connected to a newly shipped terminal device. The update may be performed via a network or via a recording medium.

(17) In the above embodiments, the processing of encrypting data together with a decryption condition, which is the expected value of a module, is referred to as "binding the data to the startup of the module". However, the binding pattern is not limited to such. The binding can be any processing that realizes access restriction, which restricts access to data in a manner that the access is permitted only when the value stored in the register of the state information holding unit matches the expected value thereof. Another possible binding pattern is to generate a key from the expected value and encrypt the key.

(18) Specifically, each of the devices described above is a computer system composed of a microprocessor, a ROM, a RAM, a hard disk unit, a display unit, a keyboard, a mouse, and the like. The RAM or the hard disk unit stores therein a computer program. Each of the devices achieves its function, by the microprocessor operating in accordance with the computer program. Here, the computer program is composed of a plurality of command codes that indicate instructions to the computer so as to achieve predetermined functions. Note that each of the devices is not limited to the computer system including all of the components described above, i.e., the microprocessor, the ROM, the RAM, the hard disk unit, the display unit, the keyboard, the mouse, and the like. Instead, each of the devices may be a computer system including some of the components described above.

(19) All or part of the components constituting each of the devices described above may be a system LSI (Large Scale Integration). A system LSI is a super multifunctional LSI manufactured by integrating multiple structural units onto a single chip. Specifically, it is a computer system including a microprocessor, a ROM, a RAM and the like. The RAM stores the computer program. The system LSI achieves its functions when the microprocessor operates in accordance with the computer program.

Also, each of the components of the above described devices may be made into one chip individually, or may also be made into one chip so as to include part or all of the components.

Although referred to as system LSIs here, the components may be referred to as ICs, LSIs, super LSIs, or ultra LSIs, depending on the degree of integration. A method of circuit integration is not limited to an LSI, but may be realized by a dedicated circuit or a general processor. It is possible to employ an FPGA (Field Programmable Gate Array) that is programmable after the LSI is produced or a reconfigurable processor that allows the reconfiguration of the connection and settings of the circuit cells in the LSI.

Furthermore, if an integration technique that replaces LSIs emerges as a result of the advance of a semiconductor technique or a derivative technique, such a technique may of course be used to integrate functional blocks. For example, biotechnology may be employed as such a technique.

(20) Part or all of the components of each device described above may be composed of a removable IC card or a single module. The IC card or the module is a computer system composed of a microprocessor, a ROM, a RAM, and the like. The IC card or the module may include the aforementioned super-multifunctional LSI. The IC card or the module achieves its functions by the microprocessor operating according to a computer program. The IC card or the module may be tamper-resistant.

(21) The present invention may be the methods described above. Furthermore, the present invention may be a computer program for causing a computer to realize the methods, or may be a digital signal representing the computer program.

Furthermore, the present invention may be a computer-readable recording medium such as a flexible disk, a hard disk, a CD-ROM, an MO, a DVD, a DVD-ROM, a DVD-RAM, a BD (Blu-ray Disc) or a semiconductor memory, that stores the computer program or the digital signal. Furthermore, the present invention may be the digital signal stored on any of the aforementioned recording media.

Furthermore, the present invention may be the computer program or the digital signal transmitted via an electric communication network, a wireless or wired communication network, a network of which the Internet is representative, a data broadcast or the like.

Furthermore, the present invention may be a computer system that includes a memory and a microprocessor, where the memory storing the computer program, and the microprocessor operating according to the computer program.

Furthermore, the present invention may be carried out by another independent computer system by recording the program or the digital signal onto any of the recording media and transferring the recording medium, or by transferring the program or the digital signal via the network or the like.

(22) The security module may be implemented by tamper-resistant software or a combination of software and hardware.

(23) The CPU may include a special operational mode (e.g., secure mode), so as to execute software securely in the special operational mode.

(24) The present invention may be any combination of the aforementioned embodiments and modifications.

INDUSTRIAL APPLICABILITY

The present invention can be widely used for an information communication apparatus or an electric household appliance that updates program data, such as a personal computer, a mobile phone, an audio player, a television receiver, or a video recorder.

In particular, in a case where terminal devices attempt to exchange data by connecting to each other, the present invention prevents processing unintended by a terminal device that transmits data, such as processing of tampering with software of the reception device and fraudulently saving transmitted data into the reception device or processing of fraudulently transferring the transmitted data to another terminal device.

Also, the present invention allows connection between the terminal devices only when the software that has started in the terminal devices is valid.

REFERENCE SIGNS LIST 100 terminal device A
101 terminal device B101
102 terminal device C
201, 301 module storage unit
202, 302 module startup control unit
203, 303 module execution unit
204, 1204 security module
205 key information holding unit
206, 306, 1206 authentication processing unit
207, 307, 1207 communication unit
208 module update unit
209 key information update unit
210 state information holding unit
211 decryption processing unit
212, 1212 signature processing unit
213 root key
1201 expected value holding unit
1202 pairing processing unit
1210 encryption processing unit
1211 key generation unit
1212 signature processing unit
1213 signature key

The invention claimed is:

1. An authentication system comprising: an authentication device; and an information processing device that is for executing an application program, the application program being subject to authentication processing performed with the authentication device,
wherein the information processing device includes:
a key holding unit securely holding therein a first decryption key corresponding to a first encryption key;
a key information holding unit holding therein an encrypted second decryption key and a first condition, the encrypted second decryption key having been encrypted using the first encryption key, and the first condition indicating a condition for outputting the second decryption key after decryption of the encrypted second decryption key;
a decryption processing unit operable to decrypt the encrypted second decryption key using the first decryption key to obtain the second decryption key, and to output the second decryption key only when the first condition is satisfied; and
a first authentication processing unit operable, when the second decryption key is output, to perform first authentication processing with the authentication device using the second decryption key,
wherein the first condition is a condition that integrity of a plurality of system programs executed in secure boot is maintained after the secure boot, the secure boot is a processing of sequentially executing the system programs from a start of boot to completion of the boot while verifying the integrity thereof,
wherein the authentication device includes:
a second authentication processing unit operable to perform the first authentication processing with the information processing device using the second decryption key; and
a transmission unit operable, when the first authentication processing is completed successfully, to transmit, to the information processing device, an encrypted authentication key having been encrypted using a second encryption key corresponding to the second decryption key, wherein the first authentication processing unit acquires the encrypted authentication key and writes the encrypted authentication key into the key information holding unit, wherein the decryption processing unit decrypts the encrypted second decryption key using the first decryption key to obtain the second decryption key after the encrypted authentication key is written into the key information holding unit, decrypts the encrypted authentication key using the second decryption key to obtain the authentication key only when the first condition is satisfied, and outputs the authentication key only when a second condition is satisfied, the second condition indicating a condition for outputting the authentication key after decryption of the encrypted authentication key, wherein the second condition is a condition that integrity of the application program is maintained, wherein the first authentication processing unit performs second authentication processing with the authentication device using the authentication key, when the authentication key is output by the decryption processing unit, and wherein the second authentication processing unit performs the second authentication processing with the information processing device using the authentication key, after the authentication key is transmitted by the transmission unit.

2. The authentication system of claim 1, wherein the information processing device further includes:
  a generation unit operable, every time any of the system programs and the application program is started, to generate a digest value thereof, cumulatively calculate the digest value and a value held therein to obtain a cumulative value, and hold the cumulative value, wherein the second decryption key held in the key information holding unit has been encrypted together with an expected value of the cumulative value after the secure boot using the first encryption key, and the authentication key has been encrypted together with an expected value of the digest value of the application program using the second encryption key, and wherein the decryption processing unit
  judges that the first condition is satisfied only when the expected value of the cumulative value decrypted together with the second decryption key matches the cumulative value generated by the generation unit after the secure boot, and
  judges that the second condition is satisfied only when the expected value of the digest value decrypted together with the authentication key matches the digest value of the application program generated by the generation unit.

3. The authentication system of claim 2, wherein the information processing device further includes:
  a program update unit operable to perform update processing on any of the system programs; and
  a key information update unit operable, when the update processing is performed after the secure boot, to replace the encrypted second decryption key in the key information holding unit with a new second decryption key that has been encrypted together with an expected value of the cumulative value after next secure boot.

4. The authentication system of claim 2, wherein the information processing device further includes:
  an expected value holding unit holding therein the expected value of the digest value of the application program and the expected value of the cumulative value after the secure boot, wherein the key information holding unit reads the expected values from the expected value holding unit, and uses the expected values to judge whether the first and second conditions are satisfied.

5. The authentication system of claim 1, wherein the first authentication processing unit is further operable, prior to the first authentication processing, (i) to cause the decryption processing unit to decrypt the encrypted second decryption key, (ii) to acquire the second decryption key output from the decryption processing unit only when the first condition is satisfied, and (iii) to perform pre-authentication processing with the authentication device using the second decryption key, and wherein the encrypted authentication key is a key acquired from the authentication device and written into the key information holding unit when the pre-authentication processing is completed successfully.

6. An authentication method used in an authentication system including an authentication device and an information processing device for executing an application program, the application program being subject to authentication processing performed with the authentication device, wherein the authentication method comprises steps, performed by the information processing device, of:
  holding therein a first decryption key corresponding to a first encryption key;
  holding therein an encrypted second decryption key and a first condition, the encrypted second decryption key having been encrypted using the first encryption key, and the first condition indicating a condition for outputting the second decryption key after decryption of the encrypted second decryption key;
  decrypting the encrypted second decryption key using the first decryption key to obtain the second decryption key, and outputting the second decryption key only when the first condition is satisfied; and
  when the second decryption key is output, performing first authentication processing with the authentication device using the second decryption key, wherein the first condition is a condition that integrity of a plurality of system programs executed in secure boot is maintained after the secure boot, the secure boot is a processing of sequentially executing the system programs from a start of boot to completion of the boot while verifying the integrity thereof, wherein the authentication method further comprises steps, performed by the authentication device, of:
  performing the first authentication processing with the information processing device using the second decryption key; and
  when the first authentication processing is completed successfully, transmitting, to the information processing device, an encrypted authentication key having been encrypted using a second encryption key corresponding to the second decryption key, wherein the authentication method further comprises a step, performed by the information processing device, of acquiring the encrypted authentication key and holding therein the encrypted authentication key, wherein the encrypted second decryption key is decrypted using the first decryption key to obtain the second decryption key after the encrypted authentication key is acquired and held by the information processing device, wherein the authentication method further comprises a step, performed by the information processing device, of decrypting the encrypted authentication key using the second decryption key to obtain the authentication key only when the first condition is satisfied, and outputting the authentication key only when a second condition is satisfied, the second condition indicating a condition for outputting the authentication key after decryption of the encrypted authentication key, wherein the second condition is a condition that integrity of the application program is maintained, wherein the authentication method further comprises a step, performed by the information processing device, of performing second authentication processing with the authentication device using the authentication key, when the authentication key is output by the information processing device, and wherein the authentication method further comprises a step, performed by the authentication device, of performing the second authentication processing with the information processing device using the authentication key, after the authentication key is transmitted to the information processing device.

7. A non-transitory computer readable recording medium having stored thereon an authentication program used in an authentication system, the authentication system including an authentication device and an information processing device for executing an application program, the application program being subject to authentication processing performed with the authentication device, the authentication program causing the authentication system to perform an authentication method, wherein the authentication method comprises steps, performed by the information processing device, of:
holding therein a first decryption key corresponding to a first encryption key;
holding therein an encrypted second decryption key and a first condition, the encrypted second decryption key having been encrypted using the first encryption key, and the first condition indicating a condition for outputting the second decryption key after decryption of the encrypted second decryption key;
decrypting the encrypted second decryption key using the first decryption key to obtain the second decryption key, and outputting the second decryption key only when the first condition is satisfied; and
when the second decryption key is output, performing first authentication processing with the authentication device using the second decryption key, wherein the first condition is a condition that integrity of a plurality of system programs executed in secure boot is maintained after the secure boot, the secure boot is a processing of sequentially executing the system programs from a start of boot to completion of the boot while verifying the integrity thereof, wherein the authentication method further comprises steps, performed by the authentication device, of:
performing the first authentication processing with the information processing device using the second decryption key; and
when the first authentication processing is completed successfully, transmitting, to the information processing device, an encrypted authentication key having been encrypted using a second encryption key corresponding to the second decryption key, wherein the authentication method further comprises a step, performed by the information processing device, of acquiring the encrypted authentication key and holding therein the encrypted authentication key, wherein the encrypted second decryption key is decrypted using the first decryption key to obtain the second decryption key after the encrypted authentication key is acquired and held by the information processing device, wherein the authentication method further comprises a step, performed by the information processing device, of decrypting the encrypted authentication key using the second decryption key to obtain the authentication key only when the first condition is satisfied, and outputting the authentication key only when a second condition is satisfied, the second condition indicating a condition for outputting the authentication key after decryption of the encrypted authentication key, wherein the second condition is a condition that integrity of the application program is maintained, wherein the authentication method further comprises a step, performed by the information processing device, of performing second authentication processing with the authentication device using the authentication key, when the authentication key is output by the information processing device, and wherein the authentication method further comprises a step, performed by the authentication device, of performing the second authentication processing with the information processing device using the authentication key, after the authentication key is transmitted to the information processing device.

8. An authentication system comprising: a first integrated circuit used in an authentication device; and a second integrated circuit used in an information processing device for executing an application program, the application program being subject to authentication processing performed with the authentication device, wherein the second integrated circuit includes:
a key holding unit holding therein a first decryption key corresponding to a first encryption key;
a key information holding unit holding therein an encrypted second decryption key and a first condition, the encrypted second decryption key having been encrypted using the first encryption key, and the first condition indicating a condition for outputting the second decryption key after decryption of the encrypted second decryption key;
a decryption processing unit operable to decrypt the encrypted second decryption key using the first decryption key to obtain the second decryption key, and to output the second decryption key only when the first condition is satisfied; and
a first authentication processing unit operable, when the second decryption key is output, to perform first authentication processing with the first integrated circuit using the second decryption key, wherein the first condition is a condition that integrity of a plurality of system programs executed in secure boot is maintained after the secure boot, the secure boot is a processing of sequentially executing the system programs from a start of boot to completion of the boot while verifying the integrity thereof, wherein the first integrated circuit includes:
- a second authentication processing unit operable to perform the first authentication processing with the second integrated circuit using the second decryption key; and
- a transmission unit operable, when the first authentication processing is completed successfully, to transmit, to the second integrated circuit, an encrypted authentication key having been encrypted using a second encryption key corresponding to the second decryption key, wherein the first authentication processing unit acquires the encrypted authentication key and writes the encrypted authentication key into the key information holding unit, wherein the decryption processing unit decrypts the encrypted second decryption key using the first decryption key to obtain the second decryption key after the encrypted authentication key is written into the key information holding unit, decrypts the encrypted authentication key using the second decryption key to obtain the authentication key only when the first condition is satisfied, and outputs the authentication key only when a second condition is satisfied, the second condition indicating a condition for outputting the authentication key after decryption of the encrypted authentication key, wherein the second condition is a condition that integrity of the application program is maintained, wherein the first authentication processing unit performs second authentication processing with the first integrated circuit using the authentication key, when the authentication key is output by the decryption processing unit, and wherein the second authentication processing unit performs the second authentication processing with the second integrated circuit using the authentication key, after the authentication key is transmitted by the transmission unit.

* * * * *